(12) United States Patent
Saito

(10) Patent No.: US 7,535,660 B2
(45) Date of Patent: May 19, 2009

(54) IMAGING LENS

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 5 days.

(21) Appl. No.: 11/881,353

(22) Filed: Jul. 26, 2007

(65) Prior Publication Data

US 2008/0037139 A1    Feb. 14, 2008

(30) Foreign Application Priority Data

Aug. 10, 2006    (JP)    ............... 2006-218123

(51) Int. Cl.
*G02B 9/06*    (2006.01)
*G02B 15/14*    (2006.01)

(52) U.S. Cl. ........................ 359/794; 359/691

(58) Field of Classification Search ............... 359/793, 359/794, 691, 717
See application file for complete search history.

(56) References Cited

U.S. PATENT DOCUMENTS

| 5,631,777 | A | 5/1997 | Mori |
| 5,978,159 | A | 11/1999 | Kamo |
| 2005/0002119 | A1* | 1/2005 | Nakamura ............... 359/791 |
| 2006/0087749 | A1* | 4/2006 | Saito ...................... 359/794 |
| 2007/0121221 | A1* | 5/2007 | Kim ....................... 359/794 |

FOREIGN PATENT DOCUMENTS

| EP | 1791012 | 5/2007 |
| JP | 2004-163850 | 6/2004 |
| JP | 2004-170460 | 6/2004 |
| JP | 2004-177628 | 6/2004 |

* cited by examiner

*Primary Examiner*—Alicia M Harrington
(74) *Attorney, Agent, or Firm*—William L. Androlia; H. Henry Koda

(57) ABSTRACT

An imaging lens is used for forming an image of an object on an image-taking surface of a solid state image sensor element and includes, in order from an object side to an image surface side, a diaphragm, a first lens which is a meniscus lens having a positive power whose convex surface faces the object side, and a second lens which is a meniscus lens having a positive power whose convex surface faces the image surface side, wherein a condition expressed by the following expression is to be satisfied: $1.45 \leq (r_3+r_4)/(r_3-r_4) \leq 3.4$, where, $r_3$: center radius curvature of the object side face of the second lens, and $r_4$: center radius curvature of the image surface side face of the second lens.

6 Claims, 25 Drawing Sheets

IMAGING LENS

BACKGROUND OF THE INVENTION

1. Field of the Invention

The present invention relates to an imaging lens. In particular, the present invention relates to an imaging lens having a two-lens structure that is capable of size and weight reduction, improved optical performance, and improved productivity. The imaging lens is used in an image-taking device that forms images of objects, such as scenery and human figures, on an image-taking surface of a solid image sensor element, such as a charge-coupled device (CCD), a complementary metal oxide semiconductor (CMOS), etc. The solid image sensor element is mounted on a portable computer, a television phone, a portable phone, and the like.

2. Description of the Related Art

In recent years, there has been an increasing demand for cameras that utilize a solid image sensor element, such as the CCD, the CMOS, or the like, that is mounted on a portable phone, a portable computer, a television phone, and the like. It is demanded that a camera such as this is small and light because the camera is required to be mounted on a limited installation space.

Therefore, it is also necessary for the imaging lens used in such cameras to be similarly small and light. Conventionally, a single-lens structure lens system using a single lens has been used as such an imaging lens.

A single-lens structure lens system such as this is can sufficiently handle a solid image sensor element having a resolution of about 110-thousand pixels, called common intermediate format (CIF). However, the single-lens structure lens system cannot fully demonstrate the resolution capability of a solid image sensor element made available in recent years, referred to as a video graphics array (VGA), having a high resolution of about 300-thousand pixels or a recent solid image sensor element having a higher resolution exceeding one million pixels.

Therefore, in recent years, various two-lens structure lens systems and three-lens structure lens systems having superior optical performance compared to the single-lens structure lens system are being proposed.

In this case, in three-lens structure lens system, aberrations leading to deterioration in optical performance can be effectively corrected, thereby allowing significantly high optical performance. However, the three-lens structure lens system has many components, making size and weight reduction difficult. There is also a problem in that, because each constituent component requires high precision, manufacturing costs also become high.

On the other hand, although optical performance that is as high as that of the three-lens structure lens system cannot be expected from the two-lens structure lens system, higher optical performance than that of the single-lens structure lens system can be obtained. Therefore, the two-lens structure lens system can be considered a suitable lens system for a compact and high-resolution solid image sensor element.

As a two-lens structure lens system such as this, numerous lens systems combining a negative lens and a positive lens, referred to as a retrofocus-type, have been proposed. However, in a retrofocus-type lens system such as this, although costs can be reduced by a reduction in the number of components, the back focus distance increases. Therefore, from the perspective of the structure of the retrofocus-type lens system, the same degree of size and weight reduction as that of the single-lens structure lens system is practically impossible.

As another two-lens structure lens system, there is a lens system combining a negative lens and a positive lens, referred to as a telephoto-type. However, a telephoto-type lens system such as this had originally been developed for silver-halide photography. Therefore, the back focus distance is too short. The lens system also has problems regarding telecentricity. Therefore, it is difficult to use the telephoto-type lens system as is as an imaging lens for the solid image sensor element.

Moreover, conventionally, in the two-lens structure and the three-lens structure lens systems, a mainstream configuration is that in which a diaphragm is disposed between two lenses adjacent to each other in the optical axis direction (refer to, for example, Patent Literatures 1 and 2).

[Patent Literature 1] Japanese Patent Unexamined Publication 2004-163850

[Patent Literature 2] Japanese Patent Unexamined Publication 2004-170460

In recent years, the demand is increasing for further improvement in optical performance, in addition to size and weight reduction. However, in the configuration in which the diaphragm is disposed between two lenses, as in the imaging lenses described in Patent Literatures 1 and 2, achieving both size and weight reduction and further improvement in optical performance is difficult. Furthermore, alignment with the characteristics of the sensor (incident angle to the sensor) is difficult.

SUMMARY OF THE INVENTION

The present invention has been achieved in light of the above-described problems. An object of the invention is to provide an imaging lens that can sufficiently meet demands for size and weight reduction and further improvement in optical performance, and improve productivity.

Productivity, herein, means not only the productivity for mass-producing imaging lens systems (such as moldability and cost when imaging lens systems are mass-produced by injection molding), but also easiness of processing, manufacture, etc. of equipment used for manufacturing the imaging lens system (such as easiness of processing a mold used for injection molding).

In order to achieve the aforementioned object, an imaging lens according to a first aspect of the present invention is an imaging lens used for forming an image of an object on an image-taking surface of a solid image sensor element comprising, in order from an object side to an image surface side: a diaphragm, a first lens which is a meniscus lens having a positive power whose convex surface faces the object side, and a second lens which is a meniscus lens having a positive power whose convex surface faces the image surface side, wherein a condition expressed by the following expression is to be satisfied:

$$1.45 \leq (r_3+r_4)/(r_3-r_4) \leq 3.4 \tag{1}$$

where, $r_3$: center radius curvature of the object side face of the second lens $r_4$: center radius curvature of the image surface side face of the second lens.

In the first aspect of the invention, the diaphragm is disposed closest to the object side. Therefore, high telecentricity can be maintained while achieving size and weight reduction. The incident angle of a light ray to the sensor of the solid image sensor element can be reduced.

Furthermore, in the first aspect of the invention, the first lens is a meniscus lens having a positive power whose convex surface faces the object side, and a second lens is a meniscus lens having a positive power whose convex surface faces the image surface side. Therefore, off-axis aberration can be successfully corrected and the telecentricity can be more effectively maintained.

Still further, in the first aspect of the invention, the condition expressed by the expression (1) is satisfied. Therefore, a balance can be achieved between optimization of an exit pupil position and distortion correction.

In the invention, the diaphragm being disposed closest to the object side does not prevent a section of the object side face (convex surface) of the first lens near the optical axis from being positioned closer to the object side than the diaphragm through the diaphragm. Even in this case, the diaphragm is physically disposed closer to the object side than the entire first lens. Therefore, this does not depart from the scope of the invention.

An imaging lens according t007Ao a second aspect is the imaging lens according to the first aspect, wherein, further, a condition expressed by a following expression (2) is to be satisfied:

$$0.5 \leq d_2/d_1 \leq 1 \quad (2)$$

where, $d_1$: center thickness of the first lens
$d_2$: distance between the first lens and the second lens on the optical axis.

In the second aspect of the present invention, further, the expression (2) is satisfied. Therefore, the productivity can be further improved, the required back focus distance can be more suitably secured, and a better optical performance can be maintained.

An imaging lens according to a third aspect is the imaging lens according to the first aspect, wherein, further, a condition expressed by a following expression (3) is to be satisfied:

$$0.1 \leq f_1/f_2 \leq 0.4 \quad (3)$$

where, $f_1$: focal distance of the first lens
$f_2$: focal distance of the second lens.

In the third aspect of the invention, further, the expression (3) is satisfied. Therefore, the entire lens system can be further reduced in size and weight while further improving the productivity and more suitably securing the required back focus distance.

An imaging lens according to a fourth aspect is the imaging lens according to the first aspect, wherein, further, a condition expressed by a following expression (4) is to be satisfied:

$$1 \leq f_1/fl \leq 1.8 \quad (4)$$

where, $f_1$: focal distance of the first lens
fl: focal distance of the entire lens system.

In the fourth aspect of the present invention, further, the expression (4) is satisfied. Therefore, the size and weight can be further reduced and the productivity can be further improved.

An imaging lens according to a fifth aspect is the imaging lens according to the first aspect, wherein, further, a condition expressed by a following expression (5) is to be satisfied:

$$1 \leq f_2/fl \leq 10 \quad (5)$$

where, $f_2$: focal distance of the second lens
fl: focal distance of the entire lens system.

In the fifth aspect of the present invention, further, the expression (5) is satisfied. Therefore, the required back focus distance can be more suitably secured and the productivity can be further improved.

An imaging lens according to a sixth aspect is the imaging lens according to the first aspect, wherein, further, a condition expressed by a following expression (6) is to be satisfied:

$$0.8 \leq L/fl \leq 1.25 \quad (6)$$

where,

L: length of the entire lens system
fl: focal distance of the entire lens system.

In the sixth aspect of the present invention, further, the expression (6) is satisfied. Therefore, the size and weight of the entire lens system can be sufficiently reduced while more effectively securing the required back focus distance, better optical performance can be maintained, and the productivity can be further improved.

An imaging lens according to a seventh aspect is the imaging lens according to the first aspect, wherein, further, conditions expressed by the following expressions (7) and (8) are to be satisfied:

$$0.1 \leq d_1/fl \leq 0.27 \quad (7)$$

$$0.1 \leq d_3/fl \leq 0.27 \quad (8)$$

where, $d_1$: center thickness of the first lens
$d_3$: center thickness of the second lens
fl: focal distance of the entire lens system.

In the seventh aspect of the present invention, further, the expressions (7) and (8) are satisfied. Therefore, the size and weight of the entire lens system can be further reduced, and the productivity can be further improved.

[Effect of the Invention]

In the imaging lens of the invention, the demands for further reduction in size and weight and further improvement in optical performance can be sufficiently met. Moreover, productivity can be improved.

DETAILED DESCRIPTION OF THE PREFERRED EMBODIMENT

An embodiment of the imaging lens according to the present invention will be described hereinafter with reference to FIG. 1.

Figure 1:
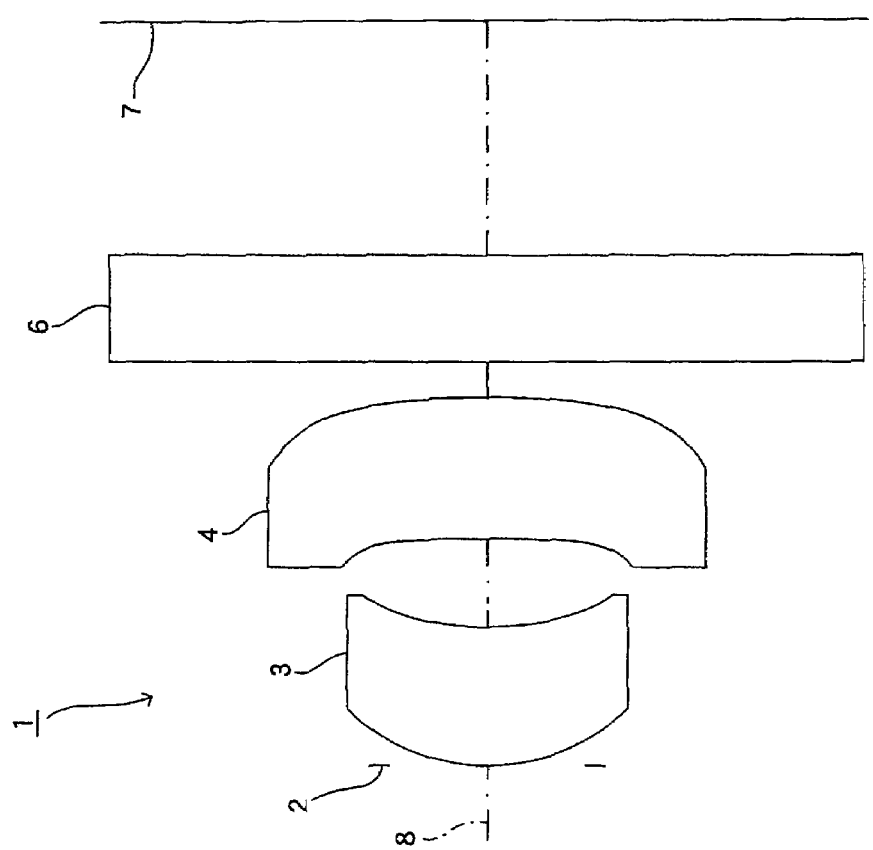
FIG. 1 is a schematic diagram for showing an embodiment of an imaging lens according to the present invention.

As shown in FIG. 1, an imaging lens 1 according to the embodiment comprises, in order from the object side toward the image surface side, a diaphragm 2, a resin-type first lens 3 which is a meniscus lens having a positive power whose convex surface faces the object side, and a resin-type second lens 4 which is a meniscus lens having a positive power whose convex surface faces the image surface side.

Hereafter, respective lens surfaces on the object side of the first lens 3 and the second lens 4 are referred to as a first face.

Respective lens surfaces on the image surface side of the first lens 3 and the second lens 4 are referred to as a second face.

On the second face of the second lens 4, there are respectively disposed various filters 6, such as a cover glass, an infrared (IR) cut filter, and a lowpass filter, and an image-taking surface 7 which is a light-receiving surface of an image sensor element, such as a CCD or a CMOS. The filter 6 may be omitted as required.

As the position of the diaphragm 2 becomes closer to the image surface side, the exit pupil position also becomes closer to the image surface side. As a result, the telecentricity becomes difficult to maintain. An off-axis light ray emitted from the imaging lens 1 is incident onto the sensor of the solid image sensor element at an angle.

Therefore, according to the embodiment, the diaphragm 2 is disposed closest to the object side. As a result, the exit pupil position can be positioned away from the sensor surface (image-taking surface 7) of the solid image sensor element.

As a result, according to the embodiment, high telecentricity can be maintained while achieving size and weight reduction, and the incident angle of the light ray to the sensor of the solid image sensor element can be reduced.

In addition, according to the embodiment, the diaphragm 2 is disposed on the object side of the first lens 3 and the first lens 3 is a meniscus lens whose convex surface faces the object side. As a result, the second face of the first lens 3 can be effectively used.

In other words, the off-axis light ray is at a steep angle to a normal line of the second face of the first lens 3 in a direction moving away from the optical axis 8. As a result, refractive power of the second face of the first lens 3 (correction effect) can be increased.

As a result, each aberration (particularly coma aberration and chromatic aberration) occurring off-axis can be effectively corrected.

On the other hand, if, for example, the shape of the second face of the first lens 3 is convex towards the image surface side or the diaphragm 2 is disposed closer to the image surface side than the first lens 3, the refractive power of the second face of the first lens 3 cannot be increased. The corrective effect on each aberration occurring off-axis, described above, becomes severely limited.

From the perspective of increasing such corrective effect on each aberration occurring off-axis, it is further effective if the second face of the first lens 3 is an aspherical surface. Furthermore, in this case, the second face of the first lens 3 is preferably an aspherical surface of which the curvature increases away from the optical axis 8. As a result, the off-axis light ray can have a steep angle to the normal line of the second face of the first lens 3 in the direction away from the optical axis 8. The corrective effect on each aberration occurring off-axis, described above, can be more effectively increased.

In addition, according to the embodiment, the shape of the second face of the second lens 4 is convex toward the image surface side. As a result, a higher telecentricity can be maintained and the incident angle of the light ray to the sensor of the solid imaging element can be more effectively controlled. Furthermore, the shape of the second face of the second lens 4 is preferably an aspherical surface of which the curvature increases away from the optical axis 8. As a result, a higher telecentricity can be maintained and the incident angle of the light ray to the sensor of the solid imaging element can be more effectively controlled.

Still further, according to the embodiment, the second lens 4 is a meniscus lens. As a result, the optical performance of the vicinity can be enhanced without a load being placed on the shape of the first lens 3 and the second lens 4. In addition, the light ray incident on the vicinity of the solid image sensor element can be used more effectively.

Still further, according to the embodiment, the first lens satisfies a condition expressed by a following expression (1):

$$1.45 \leq (r_3+r_4)/(r_3-r_4) \leq 3.4 \quad (1)$$

where, $r_3$ in the expression (1) is the center radius curvature of the first face of the second lens 4. $r_4$ in the expression (2) is the center radius curvature of the second face of the second lens 4 (the same applied hereafter).

When the value of the $(r_3+r_4)/(r_3-r_4)$ is not within the range $(1.45 \leq (r_3+r_4)/(r_3-r_4) \leq 3.4)$ in the expression (1), the exit pupil position is too close to the image surface or distortion correction becomes difficult.

Therefore, according to the embodiment, by the value of $(r_3+r_4)/(r_3-r_4)$ being set to satisfy the expression (1), a balance can be achieved between optimization of the exit pupil position and the distortion correction.

It is more preferable that the value of the $(r_3+r_4)/(r_3-r_4)$ is $1.67 \leq (r_3+r_4)/(r_3-r_4) \leq 3.4$.

Still further, according to the embodiment, the first lens satisfies a condition expressed by a following expression (2):

$$0.5 \leq d_2/d_1 \leq 1 \quad (2)$$

where, $d_1$ in the expression (2) is the center thickness of the first lens 3 (the same applied hereafter). $d_2$ in the expression (2) is the distance between the first lens 3 and the second lens 4 on the optical axis 8.

When the value of the $d_2/d_1$ is greater than the value (1) in the expression (2), the power of the first lens 3 and the second lens 4 is required to be increased. Each lens 3 and 4 becomes difficult to manufacture. In addition, the height of the light ray passing through the surface on the image surface side of the second lens 4 becomes higher. As a result, the power of the aspherical surface increases and manufacturing becomes more difficult. At the same time, when the value of the $d_2/d_1$ is less than the value (0.5) in the expression (2), the center thickness of the first lens 3 becomes relatively thick. As a result, the back focus distance becomes difficult to maintain. In addition, insertion of the diaphragm that effectively controls the amount of light becomes difficult.

Therefore, according to the embodiment, by the value of $d_2/d_1$ being set to satisfy the expression (2), the productivity can be further improved, the required back focus distance can be more suitably secured, and a better optical performance can be maintained.

It is more preferable for the relation between $d_2$ and $d_2$ to satisfy an expression $0.6 \leq d_2/d_1 \leq 1$.

Still further, according to the embodiment, the first lens satisfies a condition expressed by a following expression (3):

$$0.1 \leq f_1/f_2 \leq 0.4 \quad (3)$$

where, $f_1$ in the expression (3) is the focal distance of the first lens 3 (the same applied hereafter). $f_2$ in the expression (3) is the focal distance of the second lens 4.

When the value of the $f_1/f_2$ is greater than the value (0.4) in the expression (3), the power of the second lens 4 becomes too strong and the productivity deteriorates. In addition, the back focus distance becomes too long, and size and weight reduction becomes difficult. At the same time, when the value of the $f_1/f_2$ is less than the value (0.1) in the expression (3), the productivity of the first lens 3 deteriorates. The required back focus distance becomes difficult to secure.

Therefore, according to the embodiment, by the value of the $f_1/f_2$ being set to satisfy the expression (3), the productivity can be further improved, the required back focus distance can be more effectively secured, and the size and weight of the entire optical system can be reduced.

It is more preferable for the relation between $f_1$ and $f_2$ to satisfy an expression $0.13 \leq f_1/f_2 \leq 0.33$.

Still further, according to the embodiment, the first lens satisfies a condition expressed by a following expression (4):

$$1 \leq f_1/fl \leq 1.8 \quad (4)$$

where, fl in the expression (4) is the focal distance of the entire lens system (the same applied hereafter).

When the value of the $f_1/fl$ is greater than the value (1.8) in the expression (4), the back focus distance becomes too long and size and weight reduction becomes difficult. At the same time, when the value of the $f_1/fl$ is less than the value (1) in the expression (4), the productivity of the first lens 3 deteriorates.

It is more preferable for the relation between $f_1$ and fl to satisfy an expression $1 \leq f_1/fl \leq 1.3$.

Still further, according to the embodiment, the first lens satisfies a condition expressed by a following expression (5):

$$1 \leq f_2/fl \leq 10 \quad (5)$$

When the value of the $f_2/fl$ is greater than the value (10) in the expression (5), the productivity of the first lens 3 deteriorates and the back focus distance becomes difficult to maintain. At the same time, when the value of the $f_2/fl$ is less than the value (1) in the expression (5), the power of the second lens 4 becomes too strong. As a result, the productivity deteriorates.

Therefore, according to the embodiment, by the value of the $f_2/fl$ being set to satisfy the expression (5), the productivity can be further improved while more suitably securing the required back focus distance.

It is more preferable for the relation between $f_2$ and fl to satisfy an expression $3 \leq f_2/fl \leq 10$.

Still further, according to the embodiment, the first lens satisfies a condition expressed by a following expression (6):

$$0.8 \leq L/fl \leq 1.25 \quad (6)$$

When the value of the L/fl is greater than the value (1.25) in the expression (6), the entire lens system increases in size, against the demand for size and weight reduction. At the same time, when the value of the L/fl is less than the value (0.8) in the expression (6), the size of the entire optical system is reduced. As a result, the productivity deteriorates and the optical performance becomes difficult to maintain.

Therefore, according to the embodiment, by the value of the L/fl being set to satisfy the expression (6), the size and weight of the entire lens system can be sufficiently reduced, while maintaining the required back focus distance. In addition, excellent optical performance can be maintained and the productivity can improved.

It is more preferable for the relation between L and fl to satisfy an expression $1 \leq L/fl \leq 1.25$.

Still further, according to the embodiment, the first lens satisfies conditions expressed by following expressions (7) and (8):

$$0.1 \leq d_1/fl \leq 0.27 \quad (7)$$

$$0.1 \leq d_3/fl \leq 0.27 \quad (8)$$

where, $d_3$ in the expression (8) is the center thickness of the second lens 4.

When the value of the $d_1/fl$ is greater than the value (0.27) in the expression (7), the length of the entire lens system becomes too long, and size and weight reduction becomes difficult. At the same time, when the value of the $d_1/fl$ is less than the value (0.1) in the expression (7), the first lens 3 becomes difficult to manufacture.

Therefore, according to the embodiment, by the value of the $d_1/fl$ being set to satisfy the expression (7), the size and weight can be further reduced and productivity can be improved.

It is more preferable for the relation between $d_1$ and fl to satisfy an expression $0.15 \leq d_1/fl \leq 0.25$.

When the value of the $d_3/fl$ is greater than the value (0.27) in the expression (8), the length of the entire lens system becomes too long, and size and weight reduction becomes difficult. At the same time, when the value of the $d_3/fl$ is less than the value (0.1) in the expression (8), the second lens 4 becomes difficult to manufacture.

Therefore, according to the embodiment, by the value of the $d_3/fl$ being set to satisfy the expression (8), the size and weight of the entire optical system can be further reduced and productivity can be further improved.

It is more preferable for the relation between $d_3$ and fl to satisfy an expression $0.15 \leq d_3/fl \leq 0.25$.

In addition to the configuration described above, according to the embodiment, the first lens preferably satisfies a condition expressed by a following expression (9):

$$S \leq 0.2 \qquad (9)$$

where, S in the expression (9) is a distance between the diaphragm 2 and the optical surface closest to the object side on the optical axis 8 or, in other words, a distance between the diaphragm 2 and the first face of the first lens 3 on the optical surface 8. S is a physical distance. The diaphragm 2 can be closer to the object side or the image surface side than the point on the optical axis 8 of the first face of the first lens 3.

As a result, the telecentricity can be more effectively maintained, and the size and weight can be further reduced.

It is more preferable that the value of S is $S \leq 0.15$.

In addition to the configuration described above, according to the embodiment, the first lens preferably satisfies a condition expressed by a following expression (10):

$$0.4 \leq Bfl/fl \leq 0.8 \qquad (10)$$

where, Bfl in the expression (10) is the back focus distance or, in other words, the distance from the last lens face (the second face of the second lens 4) to the image-taking surface 7 on the optical axis (equivalent air length) (the same applies hereafter).

As a result, the size and weight can be more effectively reduced, and productivity and easiness of assembly can be further improved.

It is more preferable for the relationship between Bfl and fl to satisfy an expression $0.5 \leq Bfl/fl \leq 0.6$.

In addition to the configuration described above, according to the embodiment, the first lens preferably satisfies a condition expressed by a following expression (11):

$$0.8 \leq Bfl \leq 2.5 \qquad (11)$$

As a result, size and weight can be more effectively reduced, and productivity and easiness of assembly can be further improved.

It is more preferable that the value of Bfl is $0.85 \leq Bfl \leq 2.5$.

The resin material used to form the first lens 3 and the second lens 4 can have any composition as long as the material is transparent and can be used to mold the optical components. The material can be, for example, acrylic, polycarbonate, or non-crystalline polyolefin resin. However, from the perspective of further improvement in production efficiency and further reduction in production costs, both lenses 3 and 4 are made from the same resin material.

EXAMPLES

Next, EXAMPLES of the present invention will be described with reference to FIG. 2 to FIG. 25.

In the EXAMPLES, F no denotes F number and r denotes the radius curvature of the optical surface (the center radius curvature if it is a lens). Further, d denotes a distance to the next optical surface, nd denotes the index of refraction of each optical system when the d line (yellow) is irradiated, and vd denotes the Abbe number of each optical system also when the d line is irradiated.

k, A, B, C, and D denote each coefficient in a following expression (12). Specifically, the shape of the aspherical surface of the lens is expressed by the following expression provided that the direction of the optical axis 8 is taken as the Z axis, the direction orthogonal to the optical axis 8 as the X axis, the traveling direction of light is positive, k is the constant of cone, A, B, C, and D are the aspherical coefficients, and r is the center radius curvature.

$$Z(X) = r^{-1}X^2/[1 + \{1-(k+1)r^{-2}X^2\}^{1/2}] + AX^4 + BX^6 + CX^8 \qquad (12)$$

In the following EXAMPLES, reference code E used for a numerical value denoting the constant of cone and the aspherical coefficient indicates that the numerical value following E is an exponent having 10 as the base and that the numerical value before E indicates is multiplied by the numerical value denoted by the exponent having 10 as the base. For example, −7.99E−2 denotes $-7.99 \times 10^{-2}$.

First Example

Figure 2:
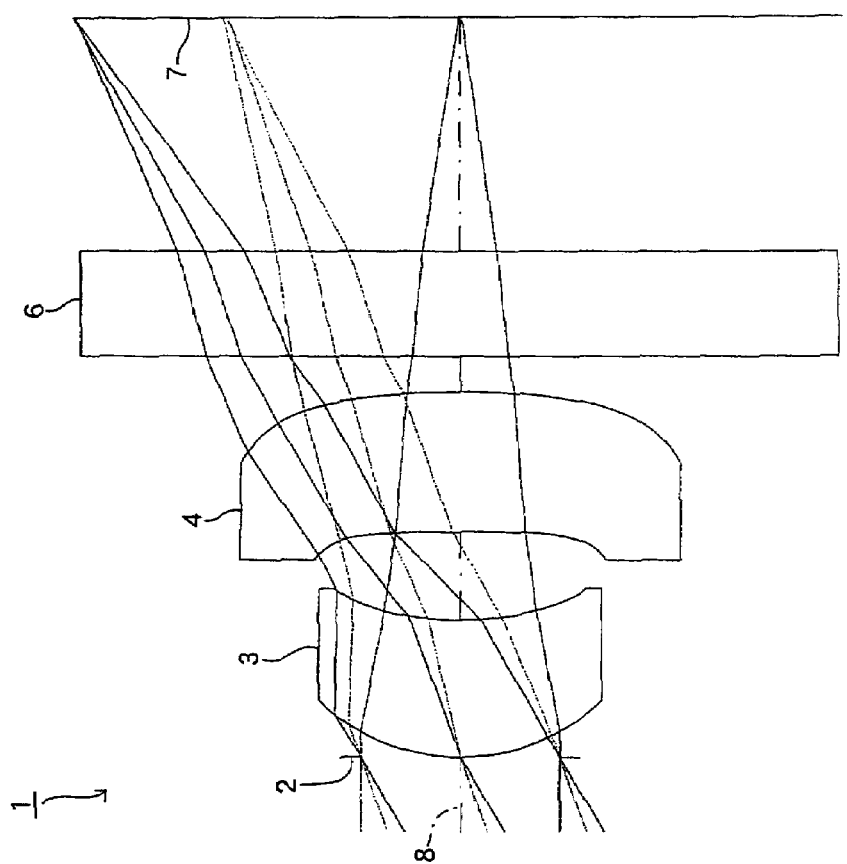
FIG. 2 is a schematic diagram for showing a FIRST EXAMPLE of the imaging lens according to the present invention.

FIG. 2 shows a FIRST EXAMPLE of the present invention. According to the example, a cover glass serving as a filter 6 is disposed between the second face of the second lens 4 and the image-taking surface 7.

The imaging lens 1 of the FIRST EXAMPLE was set under the following conditions:

Lens Data
L = 2.00 mm, fl = 1.83 mm, $f_1$ = 2.09 mm, $f_2$ = 7.19 mm, $d_1$ = 0.40 mm, $d_2$ = 0.25 mm, $d_3$ = 0.40 mm, F no = 3.25

| Face Number (Object Point) (Diaphragm) | r | d | nd | vd |
|---|---|---|---|---|
| 1 (First Face of First Lens) | 0.58 | 0.40 | 1.531 | 56.0 |
| 2 (Second Face of First Lens) | 0.92 | 0.25 | | |
| 3 (First Face of Second Lens) | −15.50 | 0.40 | 1.531 | 56.0 |
| 4 (Second Face of Second Lens) | −3.10 | 0.10 | | |
| 5 (First Face of Cover Glass) | 0.00 | 0.30 | 1.516 | 64.0 |
| 6 (Second Face of Cover Glass) | 0.00 | | | |
| (Image Surface) | | | | |

The diaphragm 2 is disposed in the same position on the optical axis 8 as the point on the optical axis 8 of the first face of the first lens 3.

| Face Number | k | A | B | C |
|---|---|---|---|---|
| 1 | −7.99E−2 | −2.54E−1 | 4.90 | −2.58E+1 |
| 2 | 4.32 | 3.06E−1 | −1.12E+1 | 7.20E+1 |

| Face Number | k | A | B | C |
|---|---|---|---|---|
| 3 | 0.00 | −7.51E−1 | −1.01E+1 | 8.75E+1 |
| 4 | 2.12E+1 | −4.99E−1 | 1.59 | −6.38 |

Under such conditions, $(r_3+r_4)/(r_3-r_4)=1.50$ was achieved, thereby satisfying the expression (1). $d_2/d_1=0.63$ was achieved, thereby satisfying the expression (2). $f_1/f_2=0.29$ was achieved, thereby satisfying the expression (3). $f_1/fl=1.14$ was achieved, thereby satisfying the expression (4). $f_2/fl=3.93$ was achieved, thereby satisfying the expression (5). $L/fl=1.09$ was achieved, thereby satisfying the expression (6). $d_1/fl=0.22$ was achieved, thereby satisfying the expression (7). $d_3/fl=0.22$ was achieved, thereby satisfying the expression (8). S=0 mm was achieved, thereby satisfying the expression (9). $Bfl/fl=0.52$ was achieved, thereby satisfying the expression (10). Bfl=0.95 mm was achieved, thereby satisfying the expression (11).

Figure 3:
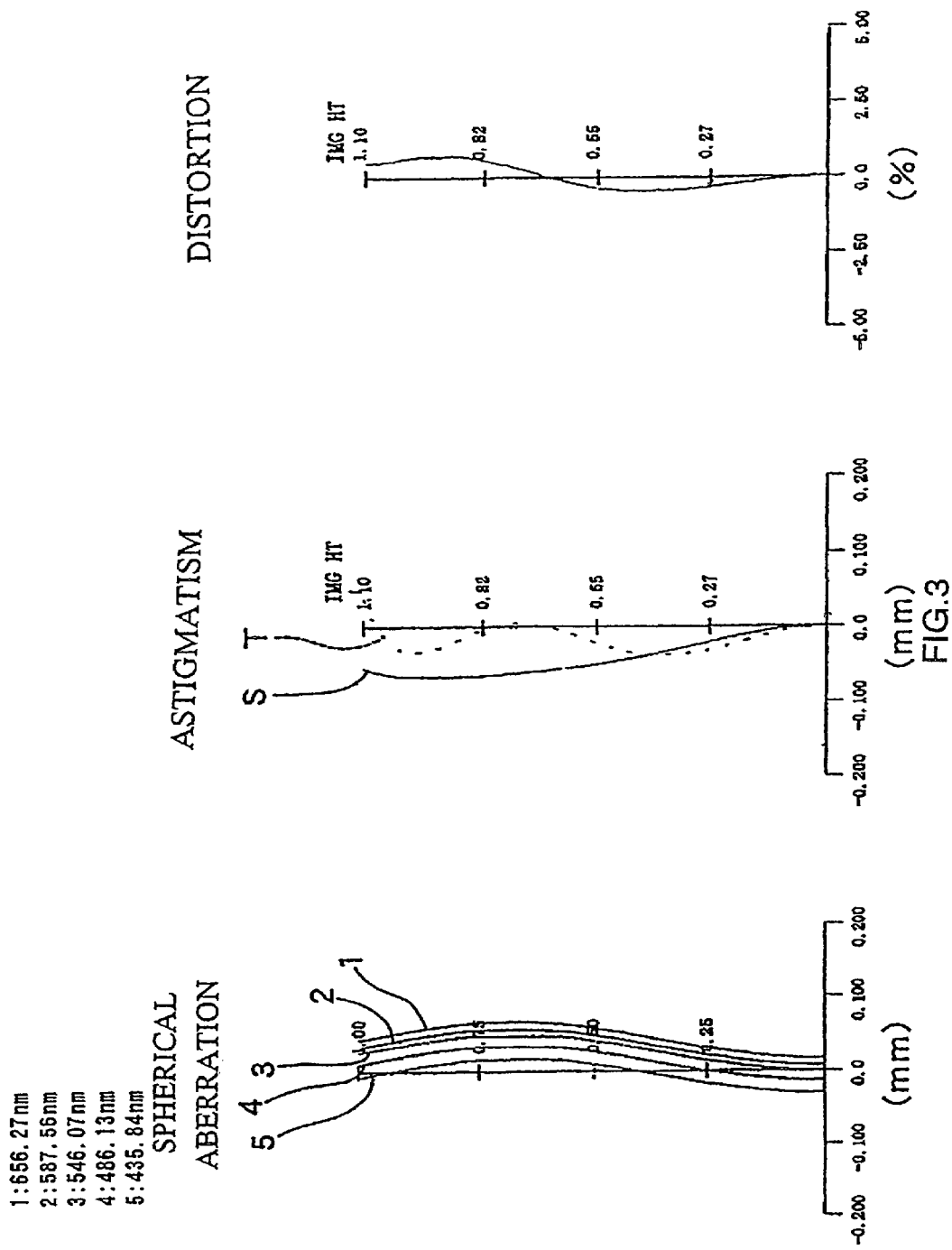
FIG. 3 shows graphs for describing the spherical aberration, astigmatism, and distortion of the imaging lens shown in FIG. 2.

FIG. 3 shows the spherical aberration, the astigmatism, and the distortion in the imaging lens 1 of the FIRST EXAMPLE.

According to the result, each of the spherical aberration, the astigmatism, and the distortion was almost satisfied. It can be seen from the result that a sufficient optical property can be obtained.

Second Example

Figure 4:
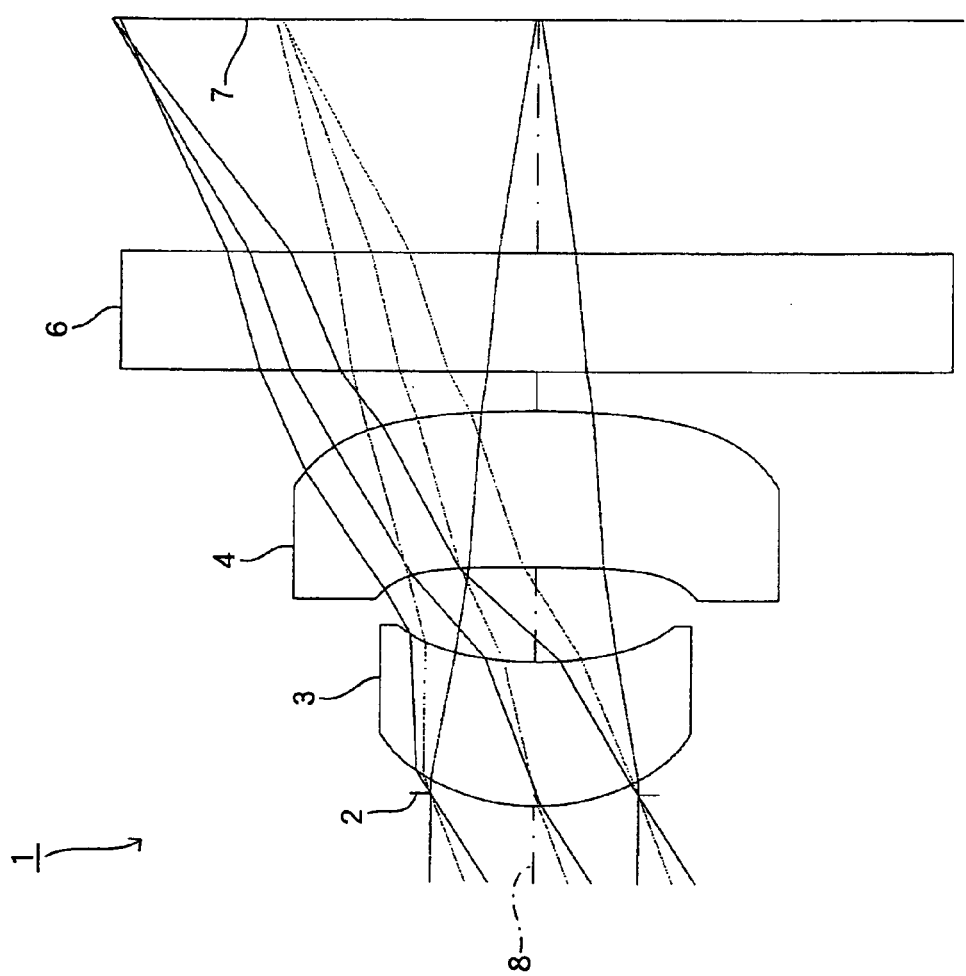
FIG. 4 is a schematic diagram for showing a SECOND EXAMPLE of the imaging lens according to the present invention.

FIG. 4 shows a SECOND EXAMPLE of the present invention. In the SECOND EXAMPLE, as in the FIRST EXAMPLE, a cover glass serving as a filter 6 is disposed between the second face of the second lens 4 and the image-taking surface 7.

The imaging lens 1 of the SECOND EXAMPLE was set under the following conditions:

| Lens Data |
|---|
| L = 1.92 mm, fl = 1.73 mm, $f_1$ = 1.96 mm, $f_2$ = 6.95 mm, $d_1$ = 0.37 mm, $d_2$ = 0.25 mm, $d_3$ = 0.40 mm, F no = 3.25 |

| Face Number (Object Point) (Diaphragm) | r | d | nd | Nd |
|---|---|---|---|---|
| 1 (First Face of First Lens) | 0.56 | 0.37 | 1.531 | 56.0 |
| 2 (Second Face of First Lens) | 0.93 | 0.25 | | |
| 3 (First Face of Second Lens) | −15.00 | 0.40 | 1.585 | 30.0 |
| 4 (Second Face of Second Lens) | −3.25 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.03 mm closer to the image surface side than the point on the optical axis 8 of the first face of the first lens 3.

| Face Number | k | A | B | C |
|---|---|---|---|---|
| 1 | −2.97E−1 | 1.02E−1 | 6.62 | −9.36E+1 |
| 2 | 8.44E−1 | 8.52E−1 | −7.44 | 8.46E+1 |
| 3 | 0.00 | −1.91 | 1.22E+1 | −1.15E+2 |
| 4 | 2.48E+1 | −8.63E−1 | 5.02 | −2.01E+1 |

Under such conditions, $(r_3+r_4)/(r_3-r_4)=1.55$ was achieved, thereby satisfying the expression (1). $d_2/d_1=0.68$ was achieved, thereby satisfying the expression (2). $f_1/f_2=0.28$ was achieved, thereby satisfying the expression (3). $f_1/fl=1.13$ was achieved, thereby satisfying the expression (4). $f_2/fl=4.02$ was achieved, thereby satisfying the expression (5). $L/fl=1.11$ was achieved, thereby satisfying the expression (6). $d_1/fl=0.21$ was achieved, thereby satisfying the expression (7). $d_3/fl=0.23$ was achieved, thereby satisfying the expression (8). S=0.03 mm was achieved, thereby satisfying the expression (9). $Bfl/fl=0.52$ was achieved, thereby satisfying the expression (10). Bfl=0.9 mm was achieved, thereby satisfying the expression (11).

Figure 5:
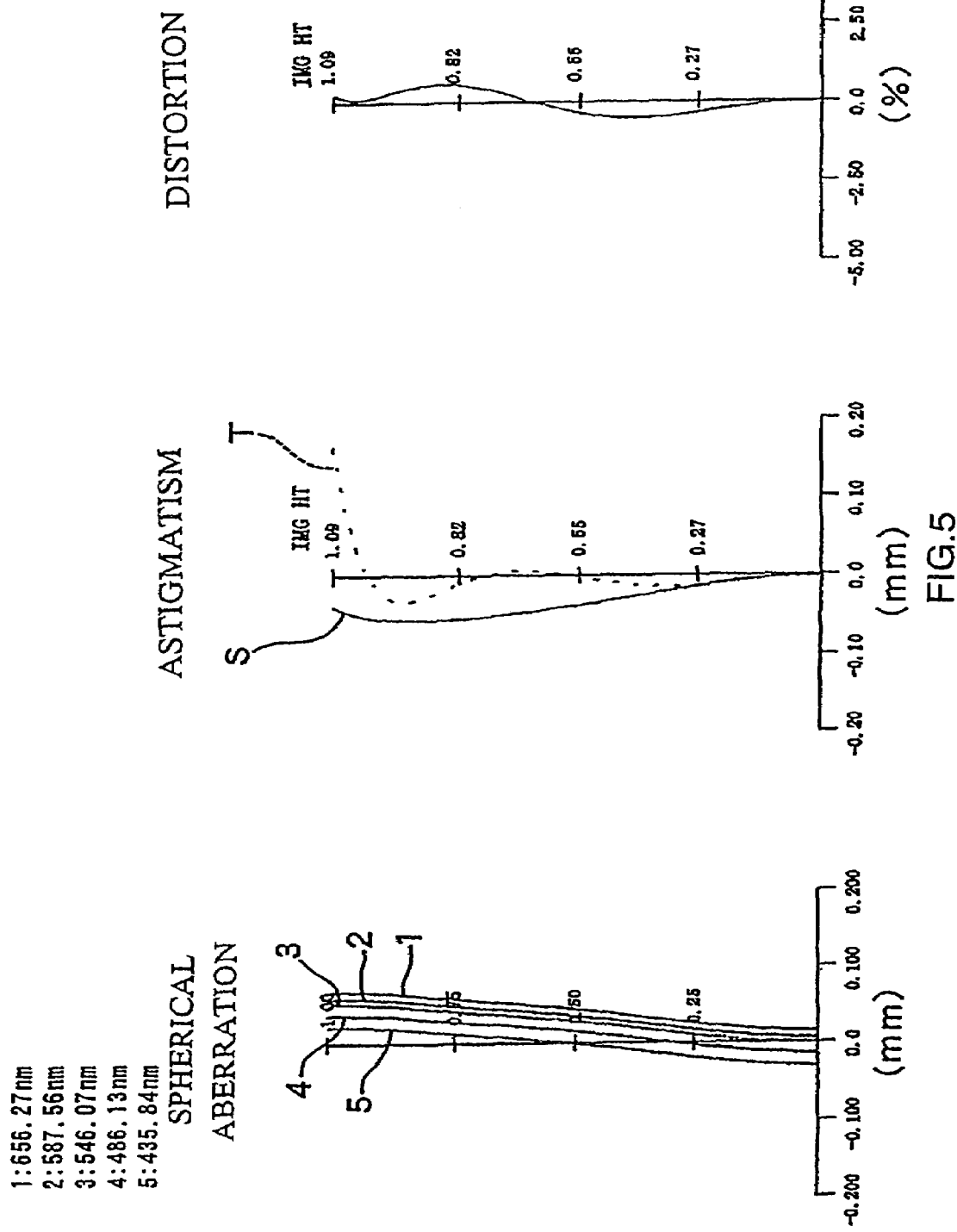
FIG. 5 shows graphs for describing the spherical aberration, astigmatism, and distortion of the imaging lens shown in FIG. 4.

FIG. 5 shows the spherical aberration, the astigmatism, and the distortion in the imaging lens 1 of the SECOND EXAMPLE.

According to the result, each of the spherical aberration, the astigmatism, and the distortion was almost satisfied. It can be seen from the result that a sufficient optical property can be obtained.

Third Example

Figure 6:
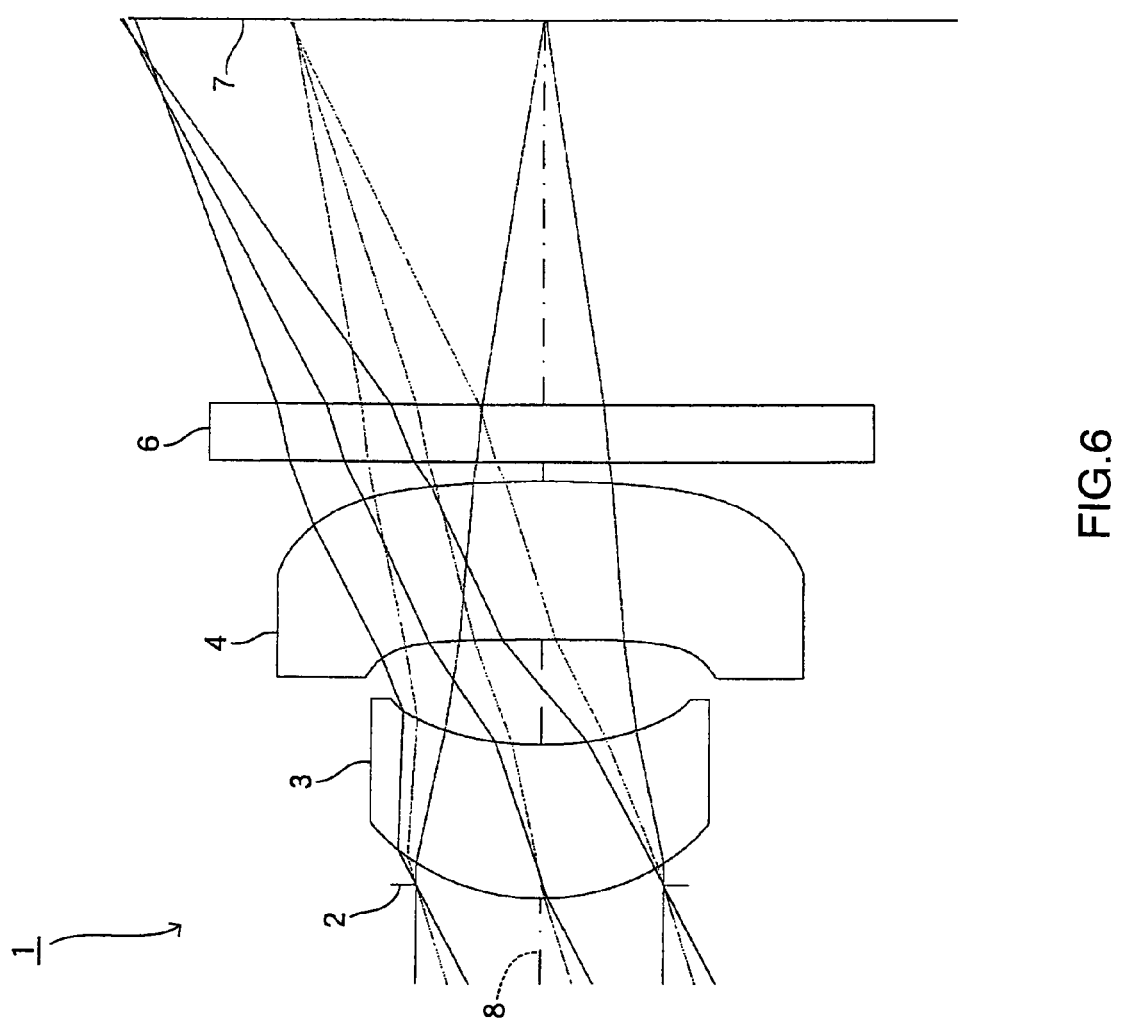
FIG. 6 is a schematic diagram for showing a THIRD EXAMPLE of the imaging lens according to the present invention.

FIG. 6 shows a THIRD EXAMPLE of the present invention. In the THIRD EXAMPLE, as in the FIRST EXAMPLE, a cover glass serving as a filter 6 is disposed between the second face of the second lens 4 and the image-taking surface 7.

The imaging lens 1 of the THIRD EXAMPLE was set under the following conditions:

| Lens Data |
|---|
| L = 4.58 mm, fl = 4.28 mm, $f_1$ = 4.88 mm, $f_2$ = 17.6 mm, $d_1$ = 0.83 mm, $d_2$ = 0.58 mm, $d_3$ = 0.85 mm, F no = 3.25 |

| Face Number (Object Point) (Diaphragm) | r | d | nd | vd |
|---|---|---|---|---|
| 1 (First Face of First Lens) | 1.25 | 0.83 | 1.531 | 56.0 |
| 2 (Second Face of First Lens) | 1.85 | 0.58 | | |
| 3 (First Face of Second Lens) | −31.50 | 0.85 | 1.531 | 56.0 |
| 4 (Second Face of Second Lens) | −7.30 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.07 mm closer to the image surface side than the point on the optical axis 8 of the first face of the first lens 3.

| Face Number | k | A | B | C |
|---|---|---|---|---|
| 1 | −7.79E−2 | −3.33E−2 | 1.75E−1 | −3.26E−1 |
| 2 | 4.07 | 1.29E−2 | −2.75E−1 | 4.60E−1 |
| 3 | 0.00 | −3.14E−2 | −3.52E−1 | 6.18E−1 |
| 4 | 2.53E+1 | −2.46E−2 | −9.92E−3 | 2.12E−3 |

Under such conditions, $(r_3+r_4)/(r_3-r_4)=1.60$ was achieved, thereby satisfying the expression (1). $d_2/d_1=0.70$ was achieved, thereby satisfying the expression (2). $f1/f_2=0.28$ was achieved, thereby satisfying the expression (3). $f_1/fl=1.14$ was achieved, thereby satisfying the expression (4). $f_2/fl=4.11$ was achieved, thereby satisfying the expression (5). L/fl=1.07 was achieved, thereby satisfying the expression (6). $d_1$/fl=0.19 was achieved, thereby satisfying the expression (7). $d_3$/fl=0.20 was achieved, thereby satisfying the expression (8). S=0.07 mm was achieved, thereby satisfying the expression (9). Bfl/fl=0.55 was achieved, thereby satisfying the expression (10). Bfl=2.34 mm was achieved, thereby satisfying the expression (11).

Figure 7:
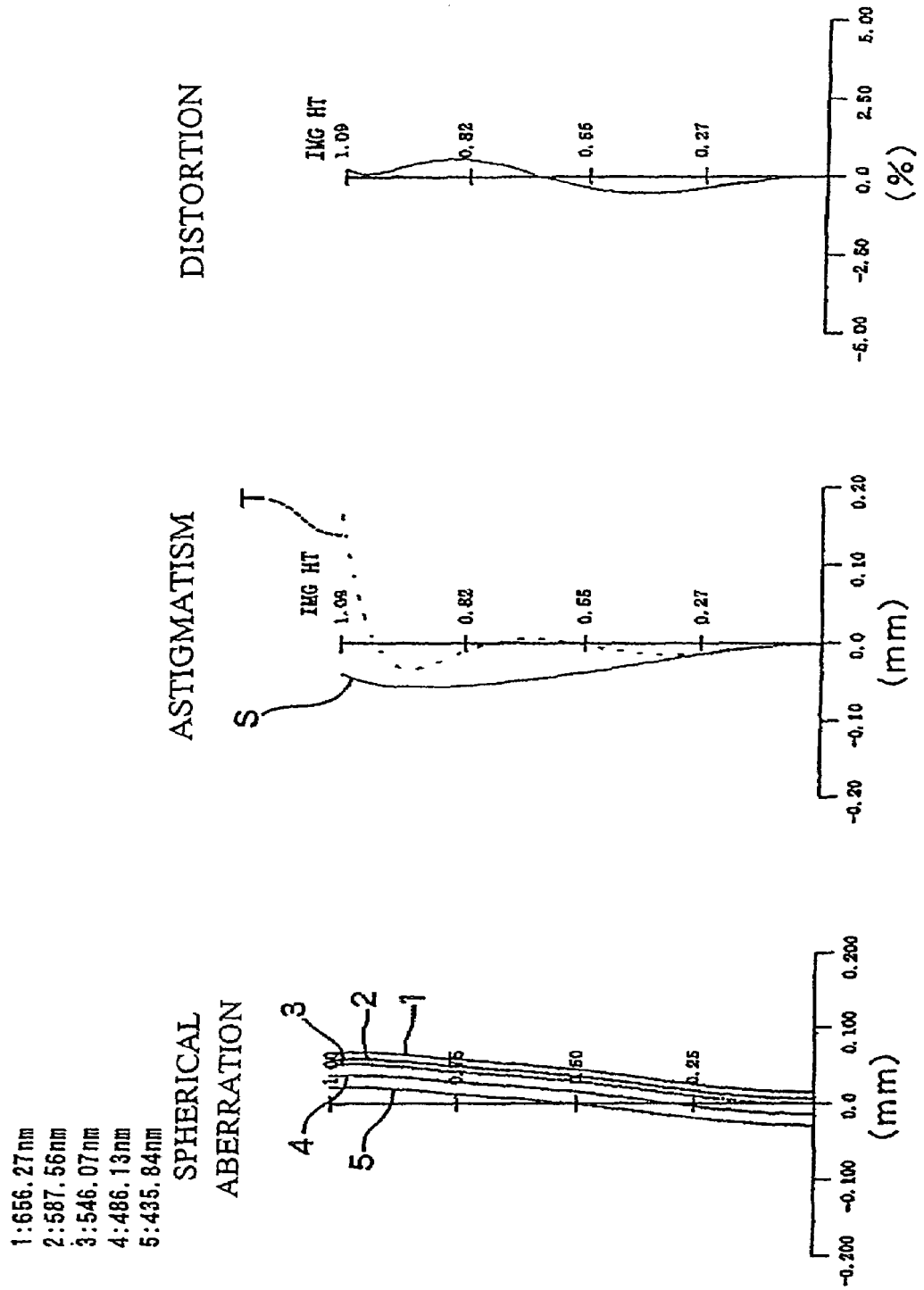
FIG. 7 shows graphs for describing the spherical aberration, astigmatism, and distortion of the imaging lens shown in FIG. 6.

FIG. 7 shows the spherical aberration, the astigmatism, and the distortion in the imaging lens 1 of the THIRD EXAMPLE.

According to the result, each of the spherical aberration, the astigmatism, and the distortion was almost satisfied. It can be seen from the result that a sufficient optical property can be obtained.

Fourth Example

Figure 8:
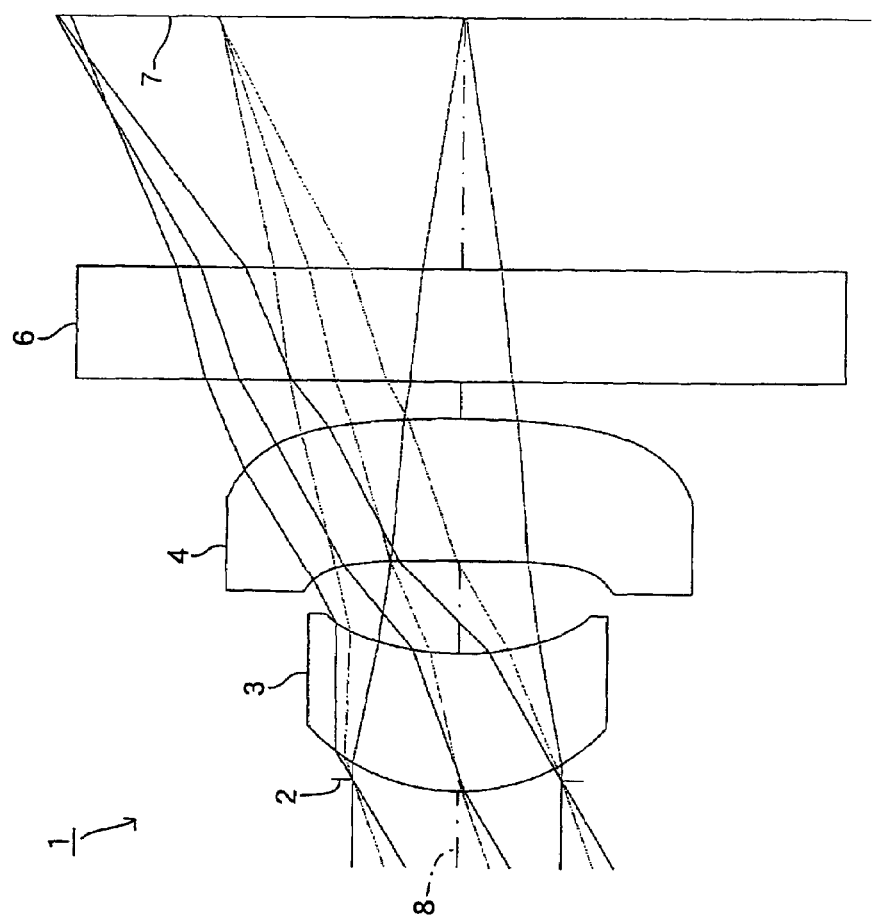
FIG. 8 is a schematic diagram for showing a FOURTH EXAMPLE of the imaging lens according to the present invention.

FIG. 8 shows a FOURTH EXAMPLE of the present invention. In the FOURTH EXAMPLE, as in the FIRST EXAMPLE, a cover glass serving as a filter 6 is disposed between the second face of the second lens 4 and the image-taking surface 7.

The imaging lens 1 of the FOURTH EXAMPLE was set under the following conditions:

Lens Data
L = 1.96 mm, fl = 1.82 mm, $f_1$ = 2.05 mm, $f_2$ = 7.93 mm, $d_1$ = 0.37 mm, $d_2$ = 0.25 mm, $d_3$ = 0.38 mm, F no = 3.25

| Face Number (Object Point) (Diaphragm) | r | d | nd | vd |
|---|---|---|---|---|
| 1 (First Face of First Lens) | 0.55 | 0.37 | 1.531 | 56.0 |
| 2 (Second Face of First Lens) | 0.85 | 0.25 | | |
| 3 (First Face of Second Lens) | −12.60 | 0.38 | 1.531 | 56.0 |
| 4 (Second Face of Second Lens) | −3.20 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.03 mm closer to the image surface side than the point on the optical axis 8 of the first face of the first lens 3.

| Face Number | k | A | B | C |
|---|---|---|---|---|
| 1 | −8.17E−2 | −4.81E−1 | 1.12E+1 | −8.64E+1 |
| 2 | 4.11 | 3.00E−1 | −1.46E+1 | 1.35E+2 |
| 3 | 0.00 | −1.09E−1 | −2.44E+1 | 2.09E+2 |
| 4 | 2.54E+1 | −2.93E−1 | −3.31E−1 | −4.94E−2 |

Under such conditions, $(r_3+r_4)/(r_3-r_4)$=1.68 was achieved, thereby satisfying the expression (1). $d_2/d_1$=0.68 was achieved, thereby satisfying the expression (2). $f_1/f_2$=0.26 was achieved, thereby satisfying the expression (3). $f_1$/fl=1.13 was achieved, thereby satisfying the expression (4). $f_2$/fl=4.36 was achieved, thereby satisfying the expression (5). L/fl=1.08 was achieved, thereby satisfying the expression (6). $d_1$/fl=0.20 was achieved, thereby satisfying the expression (7). $d_3$/fl=0.21 was achieved, thereby satisfying the expression (8). S=0.03 mm was achieved, thereby satisfying the expression (9). Bfl/fl=0.53 was achieved, thereby satisfying the expression (10). Bfl=0.96 mm was achieved, thereby satisfying the expression (11).

Figure 9:
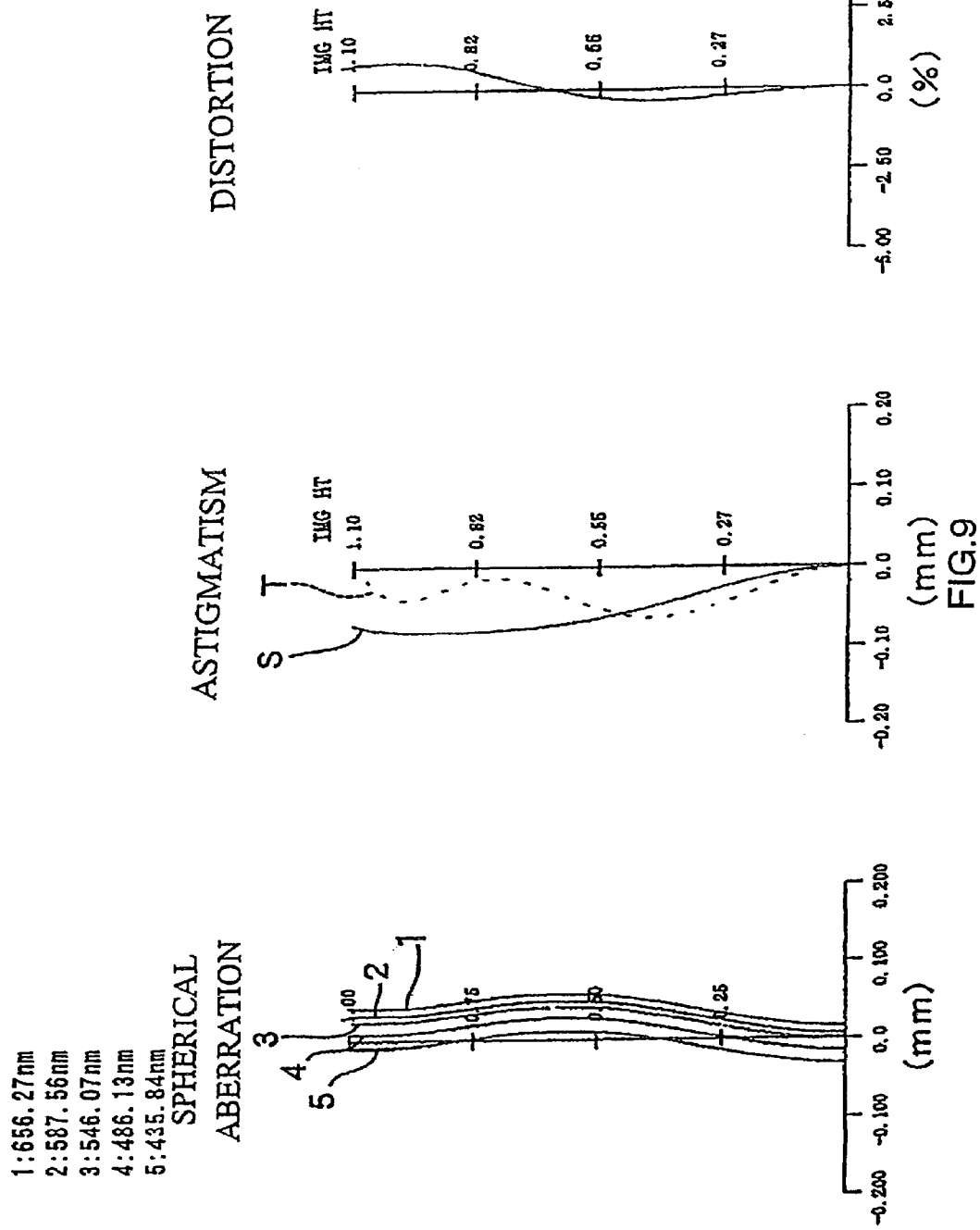
FIG. 9 shows graphs for describing the spherical aberration, astigmatism, and distortion of the imaging lens shown in FIG. 8.

FIG. 9 shows the spherical aberration, the astigmatism, and the distortion in the imaging lens 1 of the FOURTH EXAMPLE.

According to the result, each of the spherical aberration, the astigmatism, and the distortion was almost satisfied. It can be seen from the result that a sufficient optical property can be obtained.

Fifth Example

Figure 10:
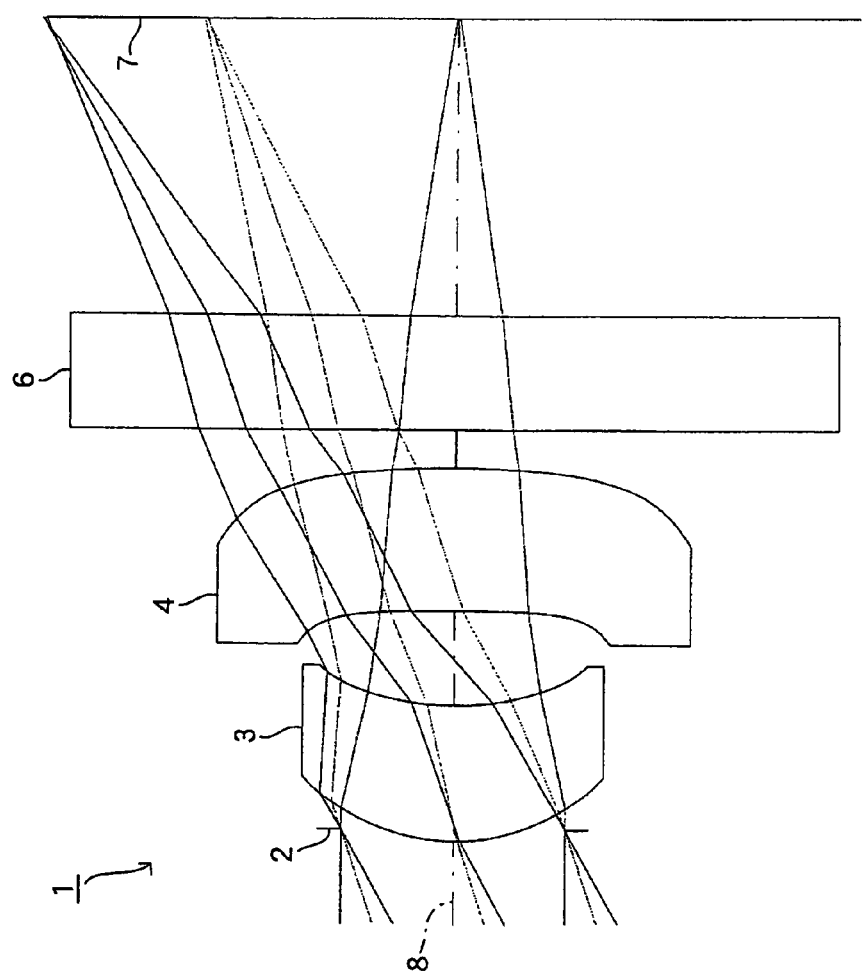
FIG. 10 is a schematic diagram for showing a FIFTH EXAMPLE of the imaging lens according to the present invention.

FIG. 10 shows a FIFTH EXAMPLE of the present invention. In the FIFTH EXAMPLE, as in the FIRST EXAMPLE, a cover glass serving as a filter 6 is disposed between the second face of the second lens 4 and the image-taking surface 7.

The imaging lens 1 of the FIFTH EXAMPLE was set under the following conditions:

Lens Data
L = 2.08 mm, fl = 1.94 mm, $f_1$ = 2.21 mm, $f_2$ = 8.1 mm, $d_1$ = 0.37 mm, $d_2$ = 0.25 mm, $d_3$ = 0.38 mm, F no = 3.25

| Face Number (Object Point) (Diaphragm) | r | d | nd | vd |
|---|---|---|---|---|
| 1 (First Face of First Lens) | 0.56 | 0.37 | 1.531 | 56.0 |
| 2 (Second Face of First Lens) | 0.82 | 0.25 | | |
| 3 (First Face of Second Lens) | −10.50 | 0.38 | 1.531 | 56.0 |
| 4 (Second Face of Second Lens) | −3.10 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.03 mm closer to the image surface side than the point on the optical axis 8 of the first face of the first lens 3.

| Face Number | k | A | B | C |
|---|---|---|---|---|
| 1 | −2.45E−1 | −2.68E−1 | 1.00E+1 | −8.11E+1 |
| 2 | 3.85 | 1.92E−1 | −1.44E+1 | 1.18E+2 |
| 3 | 0.00 | −4.85E−1 | −1.57E+1 | 1.31E+2 |
| 4 | −1.28E+1 | −4.53E−1 | −3.32E−1 | −5.57E−1 |

Under such conditions, $(r_3+r_4)/(r_3-r_4)$=1.84 was achieved, thereby satisfying the expression (1). $d_2/d_1$=0.68 was achieved, thereby satisfying the expression (2). $f_1/f_2$=0.27 was achieved, thereby satisfying the expression (3). $f_1$/fl=1.14 was achieved, thereby satisfying the expression (4). $f_2$/fl=4.18 was achieved, thereby satisfying the expression (5). L/fl=1.07 was achieved, thereby satisfying the expression (6). $d_1$/fl=0.19 was achieved, thereby satisfying the expression (7). $d_3$/fl=0.20 was achieved, thereby satisfying the expression (8). S=0.03 mm was achieved, thereby satisfying the expression (9). Bfl/fl=0.56 was achieved, thereby satisfying the expression (10). Bfl=0.8 mm was achieved, thereby satisfying the expression (11).

Figure 11:
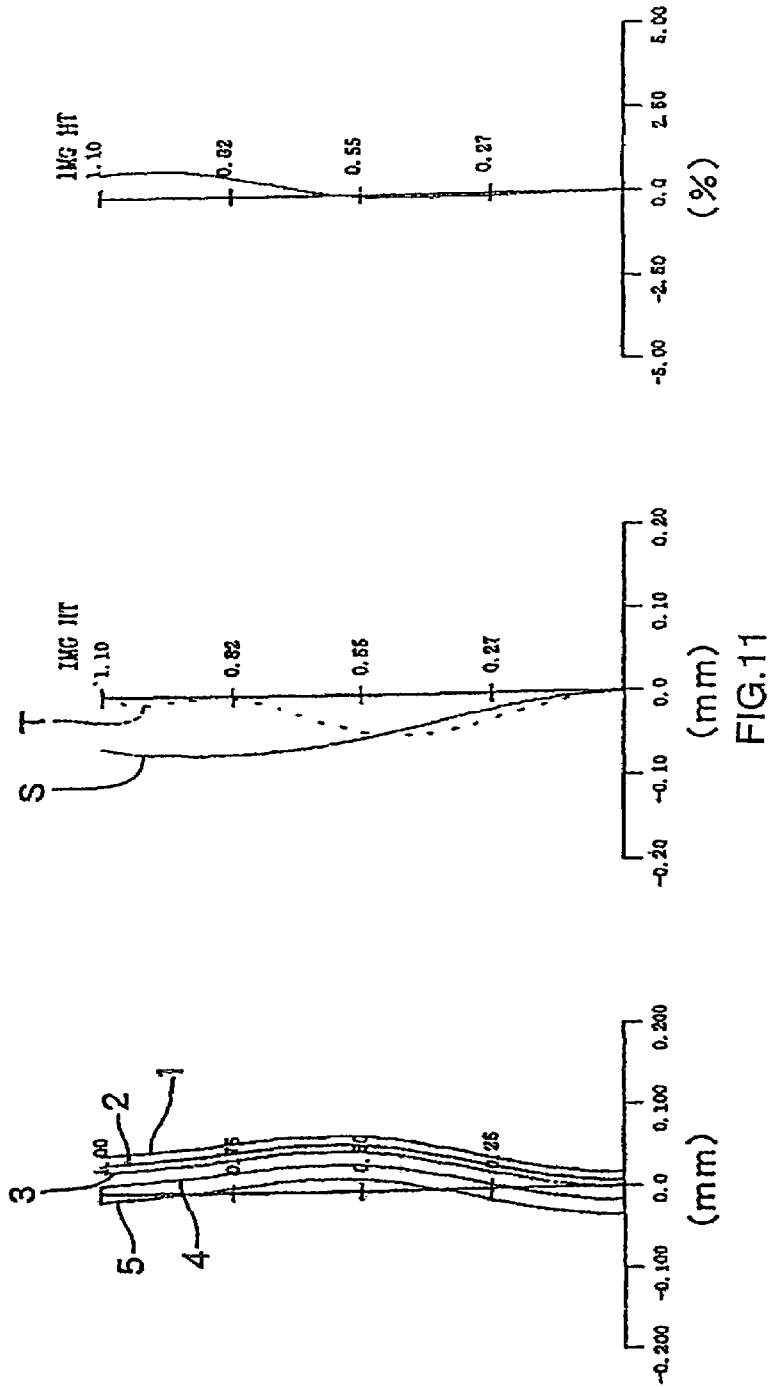
FIG. 11 shows graphs for describing the spherical aberration, astigmatism, and distortion of the imaging lens shown in FIG. 10.

FIG. 11 shows the spherical aberration, the astigmatism, and the distortion in the imaging lens 1 of the FIFTH EXAMPLE.

According to the result, each of the spherical aberration, the astigmatism, and the distortion was almost satisfied. It can be seen from the result that a sufficient optical property can be obtained.

Sixth Example

Figure 12:
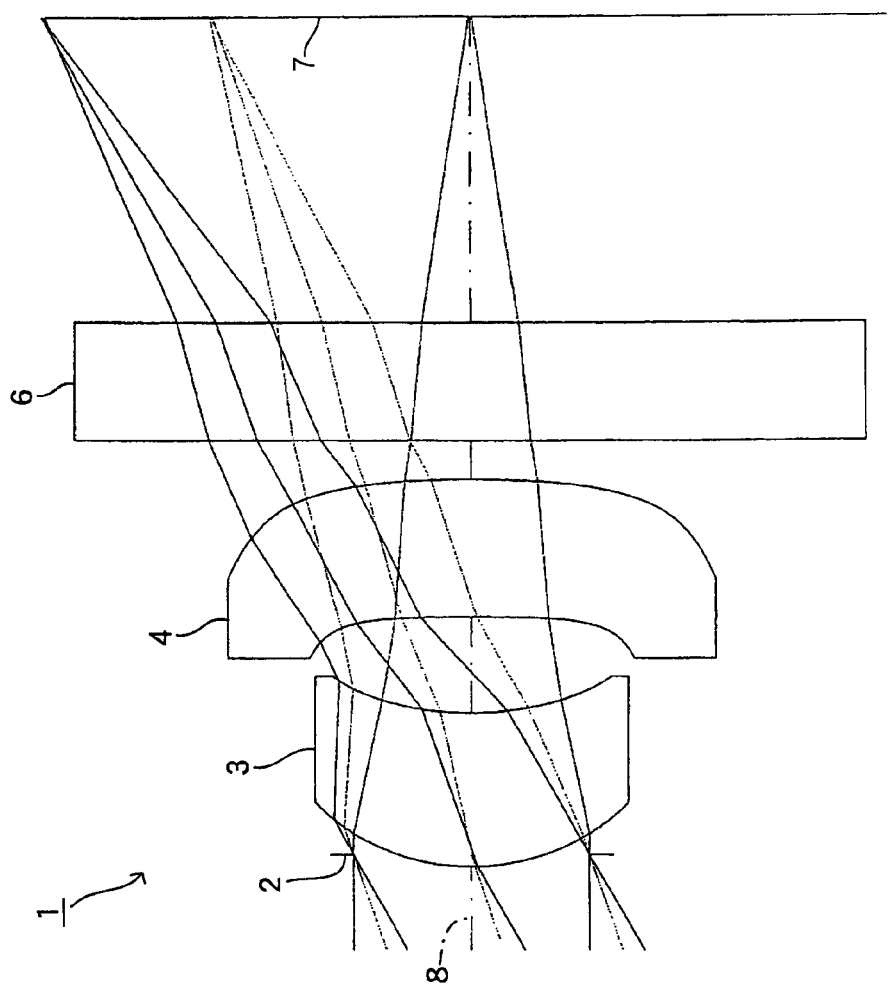
FIG. 12 is a schematic diagram for showing a SIXTH EXAMPLE of the imaging lens according to the present invention.

FIG. 12 shows a SIXTH EXAMPLE of the present invention. In the SIXTH EXAMPLE, as in the FIRST EXAMPLE, a cover glass serving as a filter 6 is disposed between the second face of the second lens 4 and the image-taking surface 7.

The imaging lens 1 of the SIXTH EXAMPLE was set under the following conditions:

Lens Data
L = 2.08 mm, fl = 1.96 mm, $f_1$ = 2.2 mm, $f_2$ = 8.88 mm, $d_1$ = 0.4 mm, $d_2$ = 0.25 mm, $d_3$ = 0.35 mm, F no = 3.25

| Face Number (Object Point) (Diaphragm) | r | d | nd | vd |
|---|---|---|---|---|
| 1 (First Face of First Lens) | 0.58 | 0.40 | 1.531 | 56.0 |
| 2 (Second Face of First Lens) | 0.86 | 0.25 | | |
| 3 (First Face of Second Lens) | −9.50 | 0.35 | 1.531 | 56.0 |
| 4 (Second Face of Second Lens) | −3.20 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.03 mm closer to the image surface side than the point on the optical axis 8 of the first face of the first lens 3.

| Face Number | k | A | B | C |
|---|---|---|---|---|
| 1 | −9.40E−4 | −4.58E−1 | 9.76 | −9.34E+1 |
| 2 | 4.28 | 1.36E−1 | −1.52E+1 | 1.16E+2 |
| 3 | 0.00 | −4.35E−1 | −2.21E+1 | 2.09E+2 |
| 4 | −1.05E+1 | −6.02E−1 | −1.11E−2 | −9.47E−1 |

Under such conditions, $(r_3+r_4)/(r_3-r_4)=2.02$ was achieved, thereby satisfying the expression (1). $d_2/d_1=0.63$ was achieved, thereby satisfying the expression (2). $f_1/f_2=0.25$ was achieved, thereby satisfying the expression (3). $f_1/fl=1.12$ was achieved, thereby satisfying the expression (4). $f_2/fl=4.53$ was achieved, thereby satisfying the expression (5). L/fl=1.06 was achieved, thereby satisfying the expression (6). $d_1/fl=0.20$ was achieved, thereby satisfying the expression (7). $d_3/fl=0.18$ was achieved, thereby satisfying the expression (8). S=0.03 mm was achieved, thereby satisfying the expression (9). Bfl/fl=0.55 was achieved, thereby satisfying the expression (10). Bfl=1.08 mm was achieved, thereby satisfying the expression (11).

Figure 13:
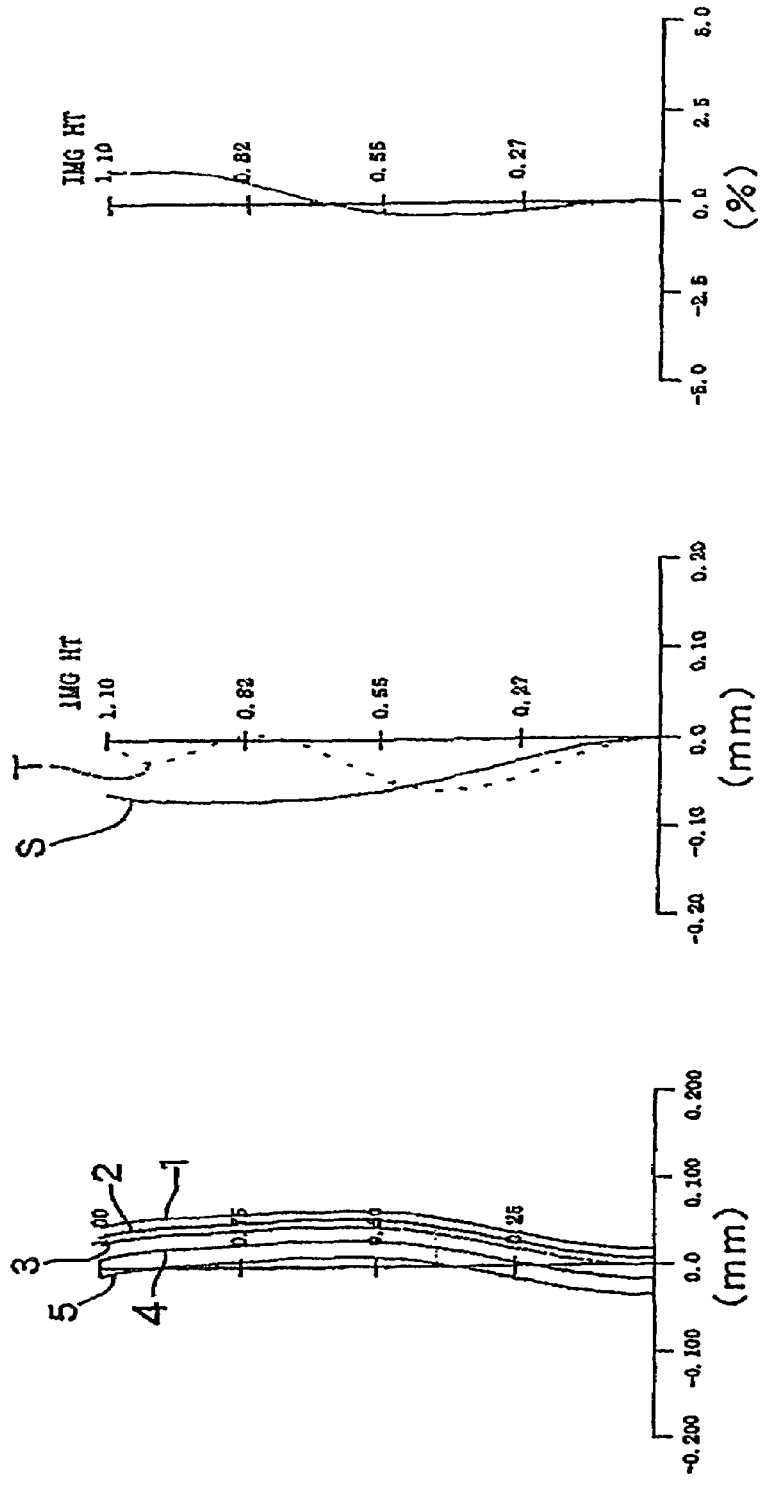
FIG. 13 shows graphs for describing the spherical aberration, astigmatism, and distortion of the imaging lens shown in FIG. 12.

FIG. 13 shows the spherical aberration, the astigmatism, and the distortion in the imaging lens 1 of the SIXTH EXAMPLE.

According to the result, each of the spherical aberration, the astigmatism, and the distortion was almost satisfied. It can be seen from the result that a sufficient optical property can be obtained.

Seventh Example

Figure 14:
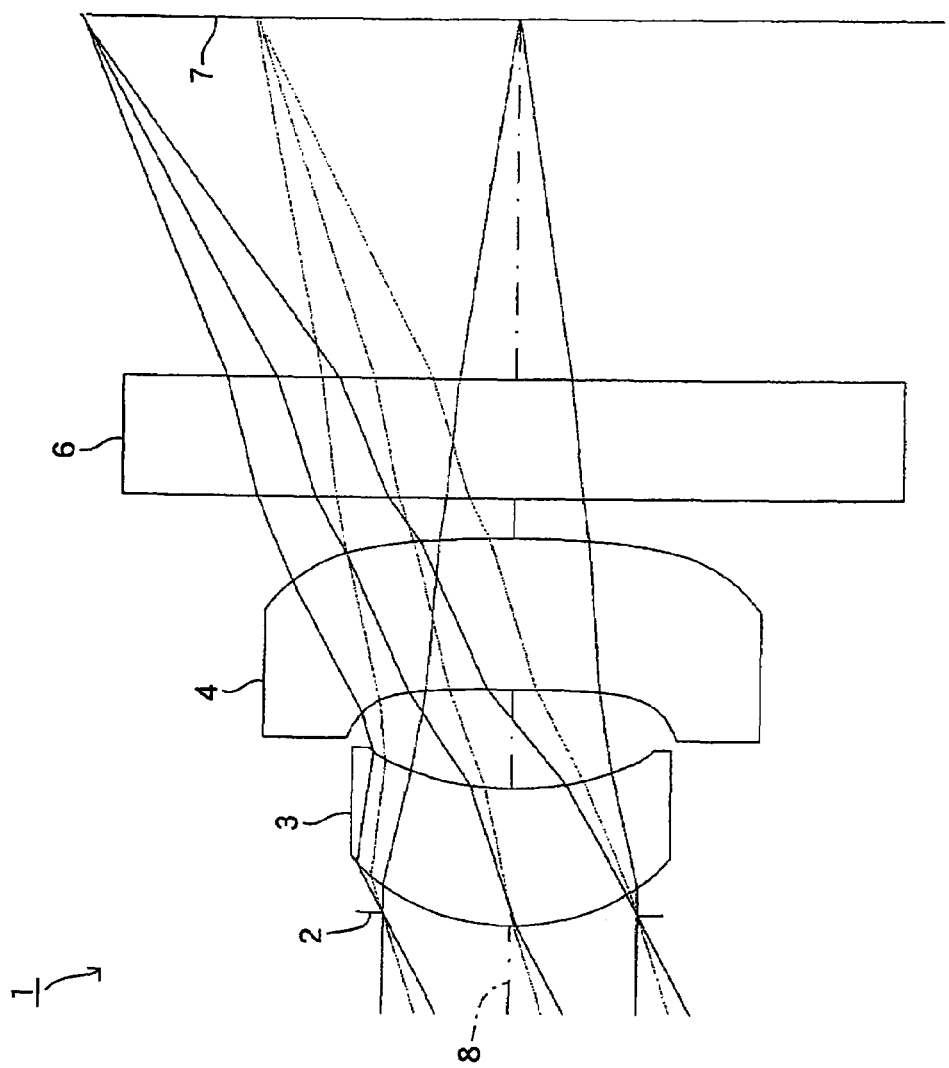
FIG. 14 is a schematic diagram for showing a SEVENTH EXAMPLE of the imaging lens according to the present invention.

FIG. 14 shows a SEVENTH EXAMPLE of the present invention. In the SEVENTH EXAMPLE, as in the FIRST EXAMPLE, a cover glass serving as a filter 6 is disposed between the second face of the second lens 4 and the image-taking surface 7.

The imaging lens 1 of the SEVENTH EXAMPLE was set under the following conditions:

Lens Data
L = 2.17 mm, fl = 2.07 mm, $f_1$ = 2.24 mm, $f_2$ = 12.65 mm, $d_1$ = 0.35 mm, $d_2$ = 0.25 mm, $d_3$ = 0.38 mm, F no = 3.55

| Face Number (Object Point) (Diaphragm) | r | d | nd | vd |
|---|---|---|---|---|
| 1 (First Face of First Lens) | 0.56 | 0.35 | 1.531 | 56.0 |
| 2 (Second Face of First Lens) | 0.82 | 0.25 | | |
| 3 (First Face of Second Lens) | −7.00 | 0.38 | 1.531 | 56.0 |
| 4 (Second Face of Second Lens) | −3.50 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.03 mm closer to the image surface side than the point on the optical axis 8 of the first face of the first lens 3.

| Face Number | k | A | B | C |
|---|---|---|---|---|
| 1 | −2.08E−1 | −2.63E−1 | 8.75 | −7.86E+1 |
| 2 | 4.12 | 1.04E−1 | −2.19E+1 | 1.96E+2 |
| 3 | 0.00 | −1.81E−1 | −2.77E+1 | 2.56E+2 |
| 4 | 5.12 | −4.27E−1 | 5.08E−1 | −6.40 |

Under such conditions, $(r_3+r_4)/(r_3-r_4)=3.00$ was achieved, thereby satisfying the expression (1). $d_2/d_1=0.71$ was achieved, thereby satisfying the expression (2). $f_1/f_2=0.18$ was achieved, thereby satisfying the expression (3). $f_1/fl=1.08$ was achieved, thereby satisfying the expression (4). $f_2/fl=6.11$ was achieved, thereby satisfying the expression (5). L/fl=1.05 was achieved, thereby satisfying the expression (6). $d_1/fl=0.17$ was achieved, thereby satisfying the expression (7). $d_3/fl=0.18$ was achieved, thereby satisfying the expression (8). S=0.03 mm was achieved, thereby satisfying the expression (9). Bfl/fl=0.57 was achieved, thereby satisfying the expression (10). Bfl=1.19 mm was achieved, thereby satisfying the expression (11).

Figure 15:
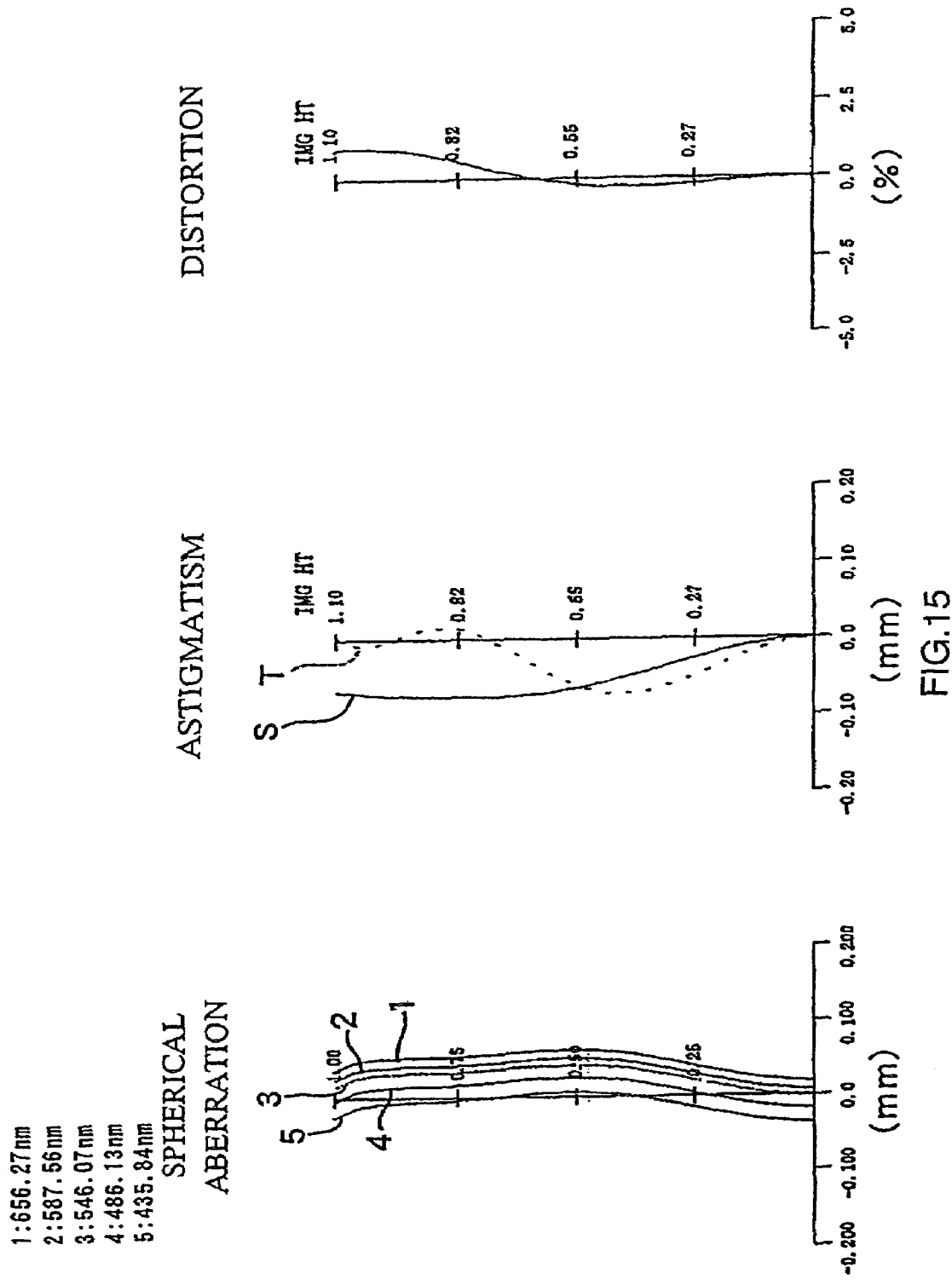
FIG. 15 shows graphs for describing the spherical aberration, astigmatism, and distortion of the imaging lens shown in FIG. 14.

FIG. 15 shows the spherical aberration, the astigmatism, and the distortion in the imaging lens 1 of the SEVENTH EXAMPLE.

According to the result, each of the spherical aberration, the astigmatism, and the distortion was almost satisfied. It can be seen from the result that a sufficient optical property can be obtained.

Eighth Example

Figure 16:
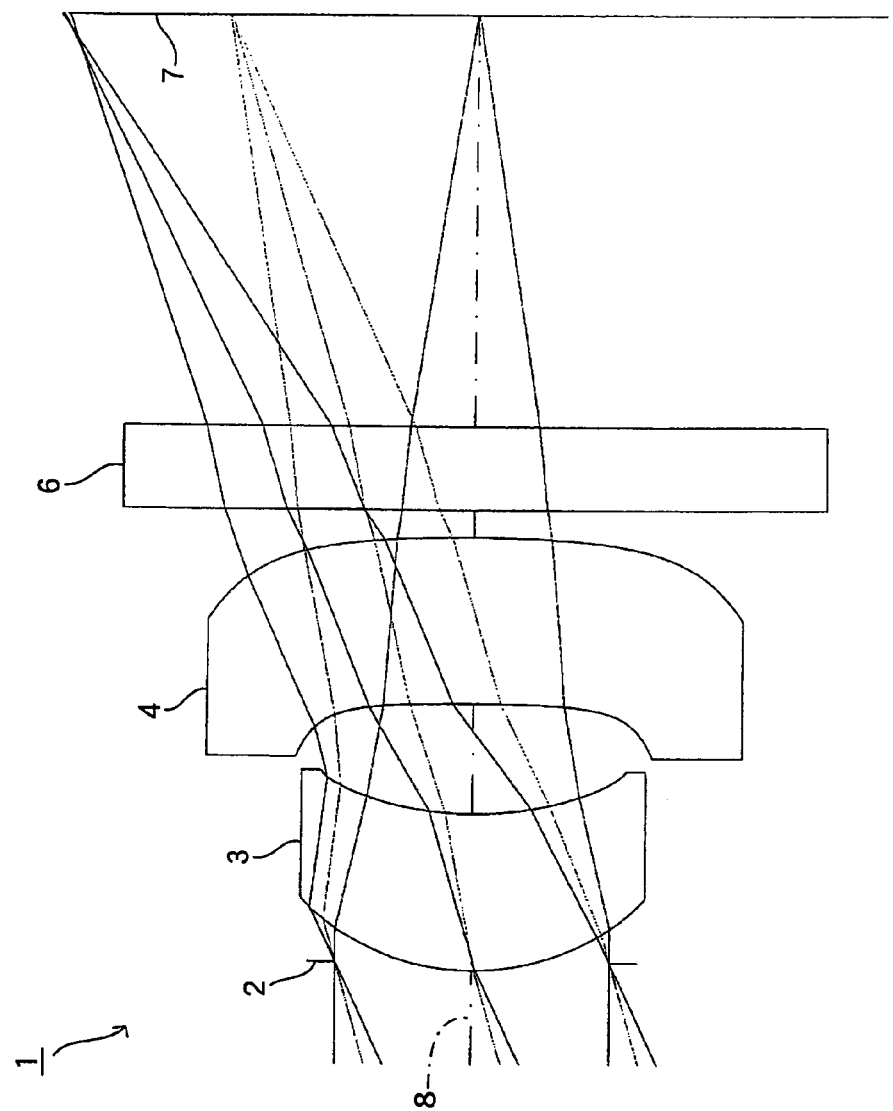
FIG. 16 is a schematic diagram for showing an EIGHTH EXAMPLE of the imaging lens according to the present invention.

FIG. 16 shows an EIGHTH EXAMPLE of the present invention. In the EIGHTH EXAMPLE, as in the FIRST EXAMPLE, a cover glass serving as a filter 6 is disposed between the second face of the second lens 4 and the image-taking surface 7.

The imaging lens 1 of the EIGHTH EXAMPLE was set under the following conditions:

Lens Data
L = 3.33 mm, fl = 3.2 mm, $f_1$ = 3.4 mm, $f_2$ = 22.76 mm, $d_1$ = 0.57 mm, $d_2$ = 0.4 mm, $d_3$ = 0.6 mm, F no = 3.25

| Face Number (Object Point) (Diaphragm) | r | d | nd | vd |
|---|---|---|---|---|
| 1 (First Face of First Lens) | 0.87 | 0.57 | 1.531 | 56.0 |
| 2 (Second Face of First Lens) | 1.28 | 0.40 | | |
| 3 (First Face of Second Lens) | −11.00 | 0.60 | 1.531 | 56.0 |
| 4 (Second Face of Second Lens) | −5.88 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.03 mm closer to the image surface side than the point on the optical axis 8 of the first face of the first lens 3.

| Face Number | k | A | B | C |
|---|---|---|---|---|
| 1 | −2.12E−1 | −7.37E−2 | 1.00 | −3.72 |
| 2 | 4.15 | 3.46E−2 | −2.37 | 8.88 |
| 3 | 0.00 | −4.94E−2 | −3.22 | 1.25E+1 |
| 4 | 3.15E+1 | −1.20E−1 | 9.17E−2 | −3.01E−1 |

Under such conditions, $(r_3+r_4)/(r_3-r_4)$=3.30 was achieved, thereby satisfying the expression (1). $d_2/d_1$=0.70 was achieved, thereby satisfying the expression (2). $f_1/f_2$=0.15 was achieved, thereby satisfying the expression (3). $f_1/fl$=1.06 was achieved, thereby satisfying the expression (4). $f_2/fl$=7.11 was achieved, thereby satisfying the expression (5). L/fl=1.04 was achieved, thereby satisfying the expression (6). $d_1/fl$=0.18 was achieved, thereby satisfying the expression (7). $d_3/fl$=0.19 was achieved, thereby satisfying the expression (8). S=0.03 mm was achieved, thereby satisfying the expression (9). Bfl/fl=0.55 was achieved, thereby satisfying the expression (10). Bfl=1.76 mm was achieved, thereby satisfying the expression (11).

Figure 17:
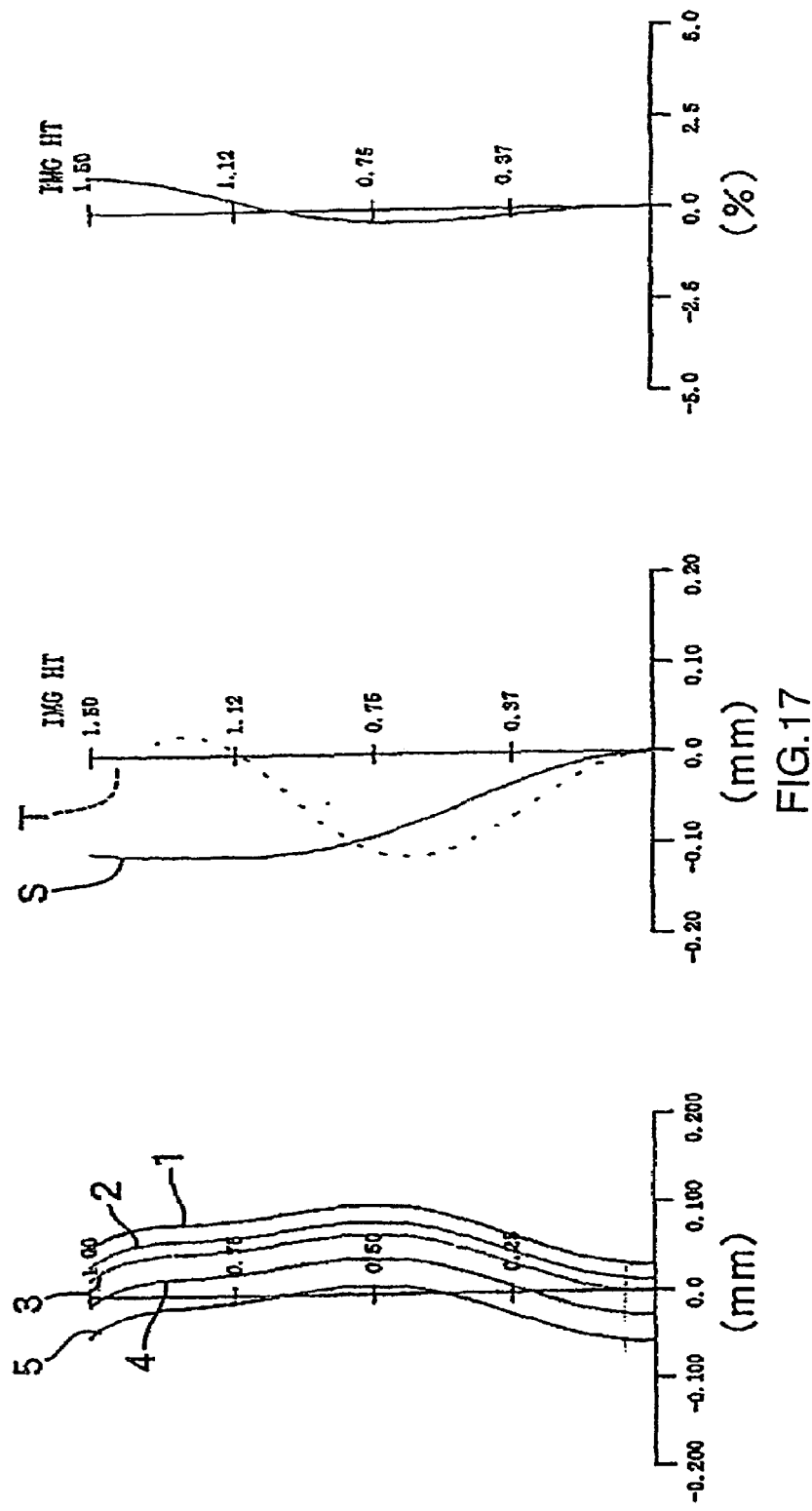
FIG. 17 shows graphs for describing the spherical aberration, astigmatism, and distortion of the imaging lens shown in FIG. 16.

FIG. 17 shows the spherical aberration, the astigmatism, and the distortion in the imaging lens 1 of the EIGHTH EXAMPLE.

According to the result, each of the spherical aberration, the astigmatism, and the distortion was almost satisfied. It can be seen from the result that a sufficient optical property can be obtained.

Ninth Example

Figure 18:
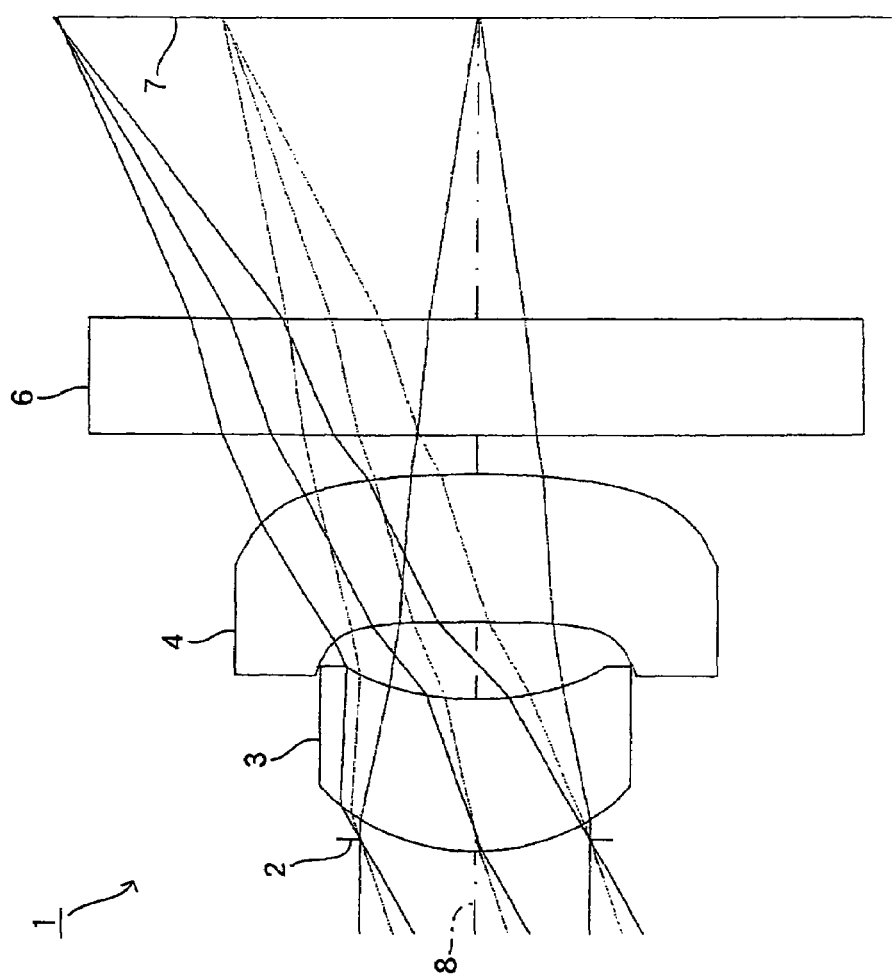
FIG. 18 is a schematic diagram for showing a NINTH EXAMPLE of the imaging lens according to the present invention.

FIG. 18 shows a NINTH EXAMPLE of the present invention. In the NINTH EXAMPLE, as in the FIRST EXAMPLE, a cover glass serving as a filter 6 is disposed between the second face of the second lens 4 and the image-taking surface 7.

The imaging lens 1 of the NINTH EXAMPLE was set under the following conditions:

Lens Data
L = 2.05 mm, fl = 1.92 mm, $f_1$ = 2.14 mm, $f_2$ = 8.79 mm, $d_1$ = 0.4 mm, $d_2$ = 0.2 mm, $d_3$ = 0.38 mm, F no = 3.25

| Face Number (Object Point) (Diaphragm) | r | d | nd | vd |
|---|---|---|---|---|
| 1 (First Face of First Lens) | 0.56 | 0.40 | 1.531 | 56.0 |
| 2 (Second Face of First Lens) | 0.83 | 0.20 | | |
| 3 (First Face of Second Lens) | −8.00 | 0.38 | 1.585 | 30.0 |
| 4 (Second Face of Second Lens) | −3.20 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.03 mm closer to the image surface side than the point on the optical axis 8 of the first face of the first lens 3.

| Face Number | k | A | B | C |
|---|---|---|---|---|
| 1 | −1.07E−1 | −4.00E−1 | 1.00E+1 | −9.57E+1 |
| 2 | 4.30 | 3.42E−2 | −1.70E+1 | 1.20E+2 |
| 3 | 0.00 | −4.12E−1 | −2.51E+1 | 2.55E+2 |
| 4 | 2.70E+1 | −4.63E−1 | 1.26 | −7.58 |

Under such conditions, $(r_3+r_4)/(r_3-r_4)$=2.33 was achieved, thereby satisfying the expression (1). $d_2/d_1$=0.50 was achieved, thereby satisfying the expression (2). $f_1/f_2$=0.24 was achieved, thereby satisfying the expression (3). $f_1/fl$=1.11 was achieved, thereby satisfying the expression (4). $f_2/fl$=4.58 was achieved, thereby satisfying the expression (5). L/fl=1.07 was achieved, thereby satisfying the expression (6). $d_1/fl$=0.21 was achieved, thereby satisfying the expression (7). $d_3/fl$=0.20 was achieved, thereby satisfying the expression (8). S=0.03 mm was achieved, thereby satisfying the expression (9). Bfl/fl=0.56 was achieved, thereby satisfying the expression (10). Bfl=1.07 mm was achieved, thereby satisfying the expression (11).

Figure 19:
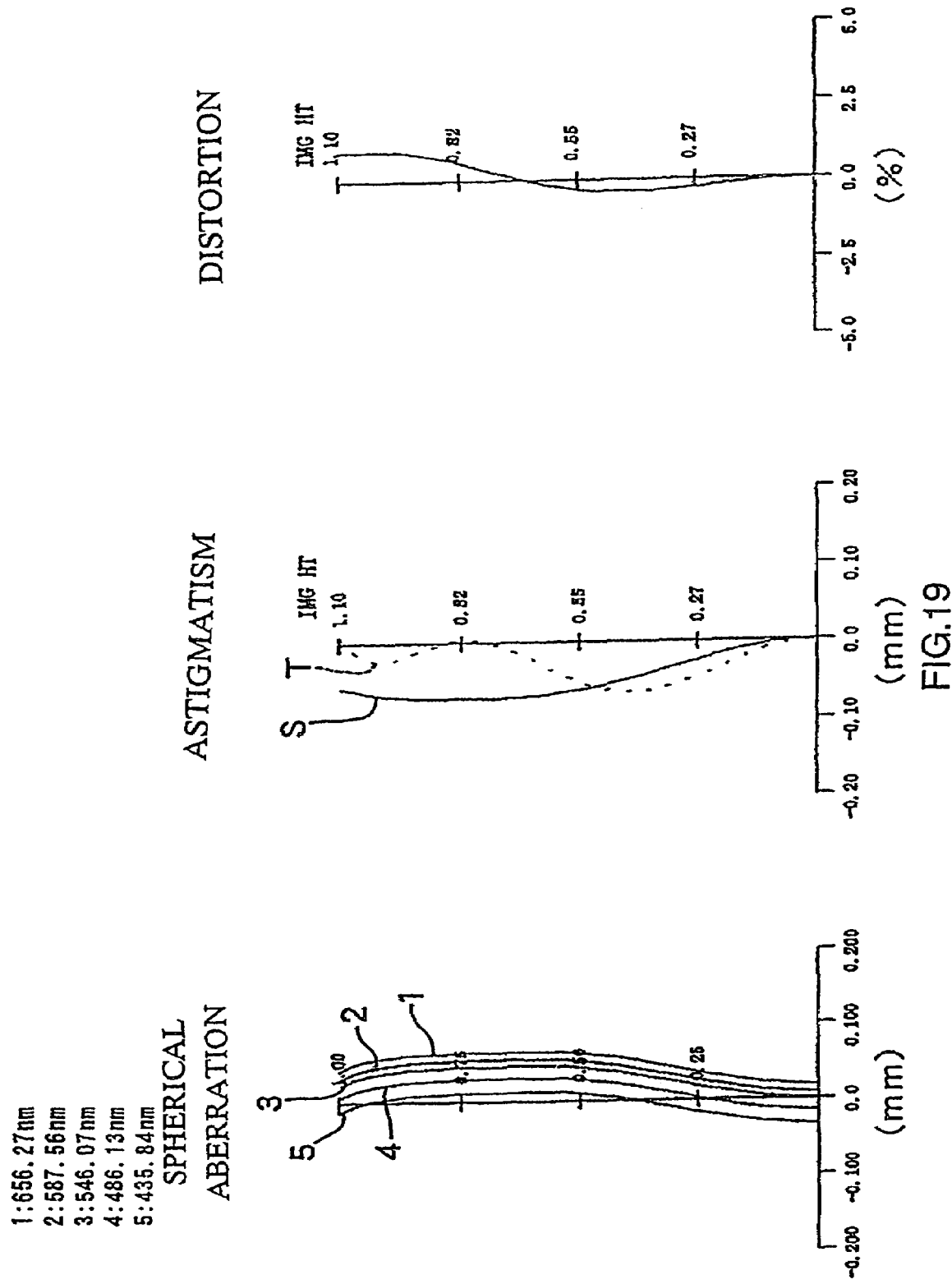
FIG. 19 shows graphs for describing the spherical aberration, astigmatism, and distortion of the imaging lens shown in FIG. 18.

FIG. 19 shows the spherical aberration, the astigmatism, and the distortion in the imaging lens 1 of the NINTH EXAMPLE.

According to the result, each of the spherical aberration, the astigmatism, and the distortion was almost satisfied. It can be seen from the result that a sufficient optical property can be obtained.

Tenth Example

Figure 20:
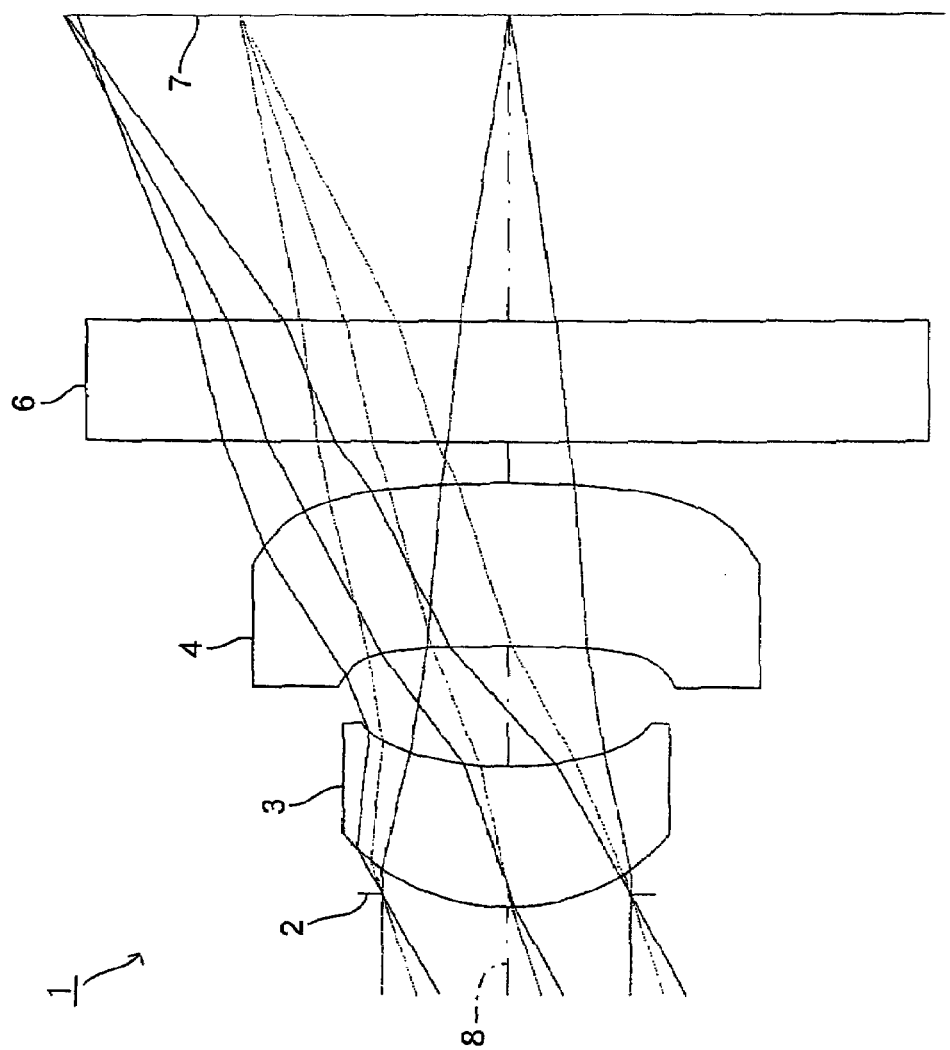
FIG. 20 is a schematic diagram for showing a TENTH EXAMPLE of the imaging lens according to the present invention.

FIG. 20 shows a TENTH EXAMPLE of the present invention. In the TENTH EXAMPLE, as in the FIRST EXAMPLE, a cover glass serving as a filter 6 is disposed between the second face of the second lens 4 and the image-taking surface 7.

The imaging lens 1 of the TENTH EXAMPLE was set under the following conditions:

| Lens Data |
|---|
| L = 2.09 mm, fl = 1.98 mm, $f_1$ = 2.13 mm, $f_2$ = 11.6 mm, $d_1$ = 0.35 mm, $d_2$ = 0.3 mm, $d_3$ = 0.4 mm, F no = 3.25 |

| Face Number (Object Point) (Diaphragm) | r | d | nd | vd |
|---|---|---|---|---|
| 1 (First Face of First Lens) | 0.55 | 0.35 | 1.531 | 56.0 |
| 2 (Second Face of First Lens) | 0.83 | 0.30 | | |
| 3 (First Face of Second Lens) | −7.75 | 0.40 | 1.531 | 56.0 |
| 4 (Second Face of Second Lens) | −3.50 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.03 mm closer to the image surface side than the point on the optical axis 8 of the first face of the first lens 3.

| Face Number | k | A | B | C |
|---|---|---|---|---|
| 1 | −5.53E−2 | −3.77E−1 | 9.88 | −9.43E+1 |
| 2 | 4.26 | 8.62E−2 | −1.55E+1 | 1.34E+2 |
| 3 | 0.00 | −2.71E−1 | −2.34E+1 | 2.12E+2 |
| 4 | 2.72E+1 | −3.23E−1 | −1.91E−1 | −1.09 |

Under such conditions, $(r_3+r_4)/(r_3-r_4)=2.65$ was achieved, thereby satisfying the expression (1). $d_2/d_1=0.86$ was achieved, thereby satisfying the expression (2). $f_1/f_2=0.18$ was achieved, thereby satisfying the expression (3). $f_1/fl=1.08$ was achieved, thereby satisfying the expression (4). $f_2/fl=5.86$ was achieved, thereby satisfying the expression (5). $L/fl=1.06$ was achieved, thereby satisfying the expression (6). $d_1/fl=0.18$ was achieved, thereby satisfying the expression (7). $d_3/fl=0.20$ was achieved, thereby satisfying the expression (8). S=0.03 mm was achieved, thereby satisfying the expression (9). $Bfl/fl=0.53$ was achieved, thereby satisfying the expression (10). Bfl=1.04 mm was achieved, thereby satisfying the expression (11).

Figure 21:
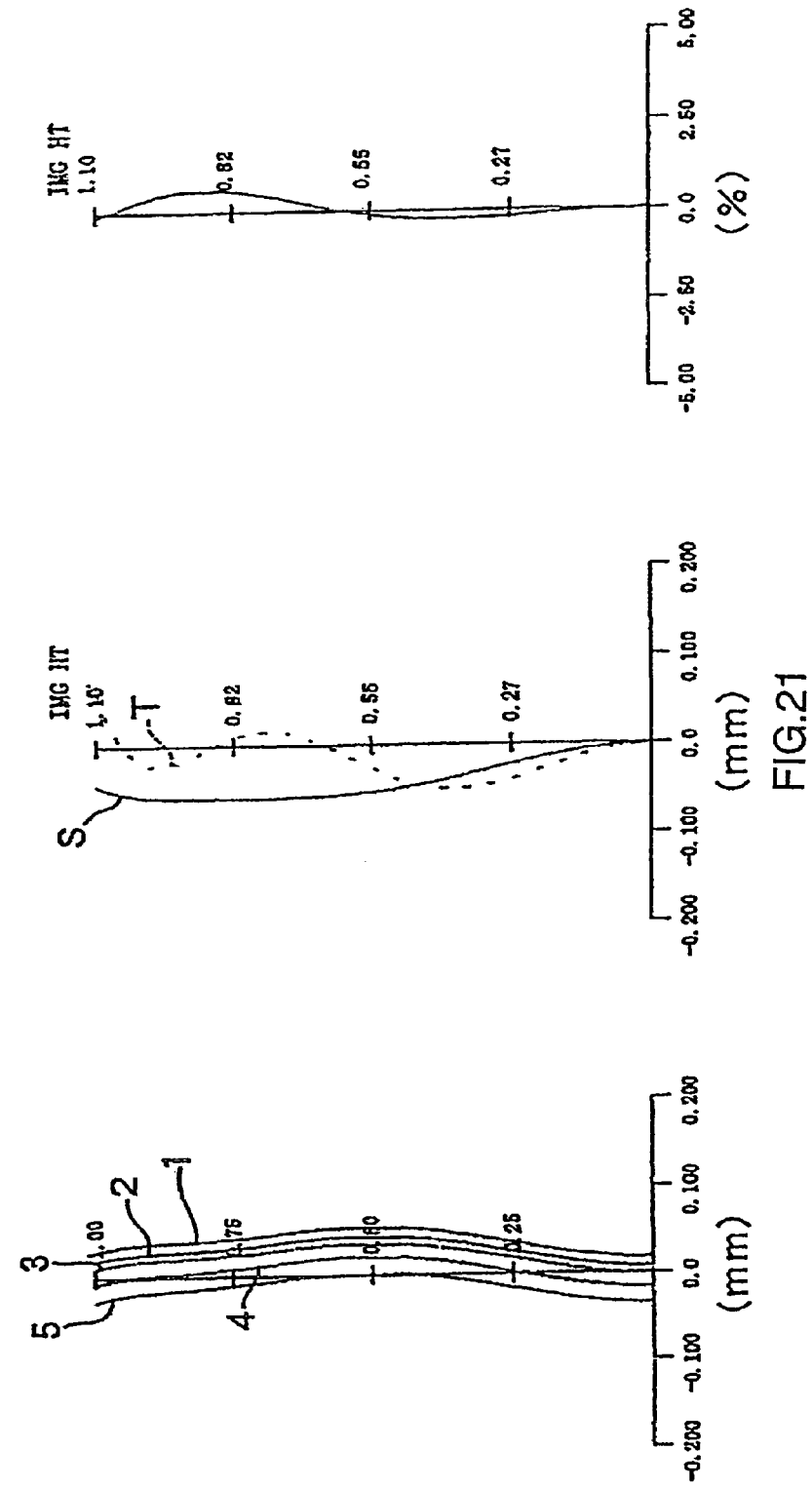
FIG. 21 shows graphs for describing the spherical aberration, astigmatism, and distortion of the imaging lens shown in FIG. 20.

FIG. 21 shows the spherical aberration, the astigmatism, and the distortion in the imaging lens 1 of the TENTH EXAMPLE.

According to the result, each of the spherical aberration, the astigmatism, and the distortion was almost satisfied. It can be seen from the result that a sufficient optical property can be obtained.

Eleventh Example

Figure 22:
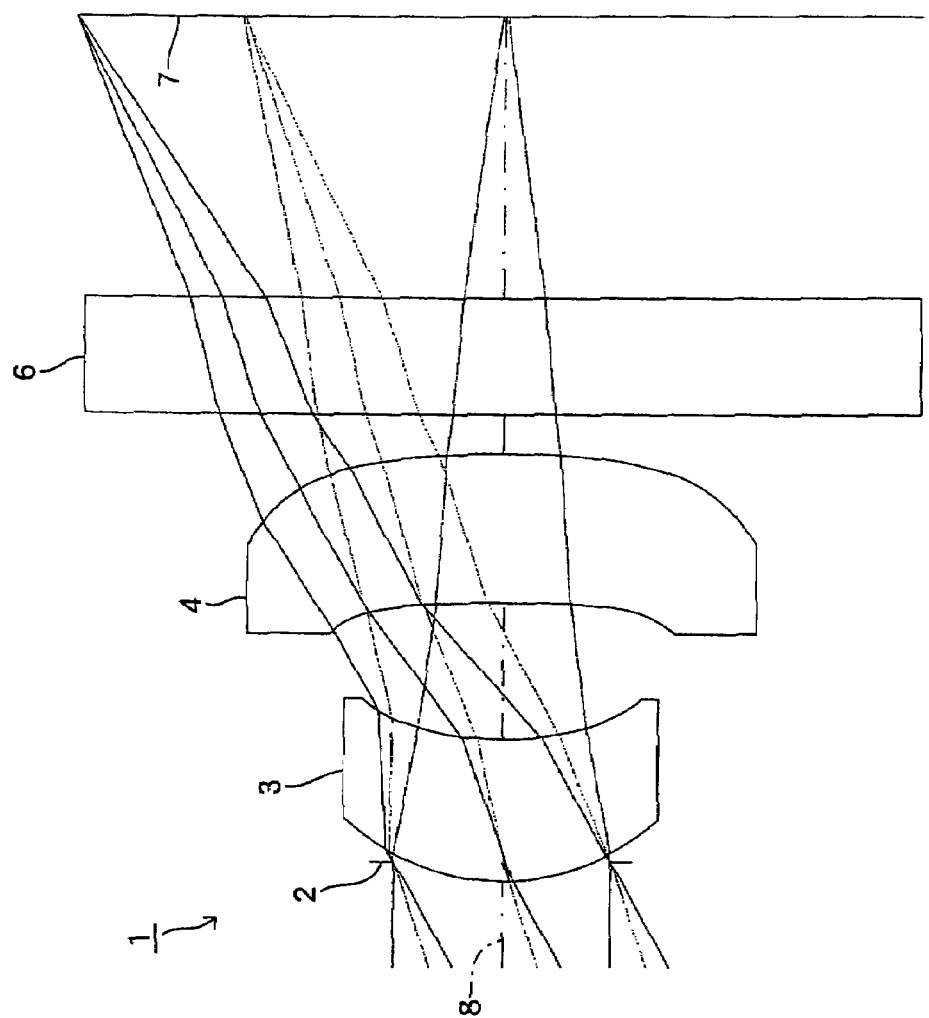
FIG. 22 is a schematic diagram for showing an ELEVENTH EXAMPLE of the imaging lens according to the present invention.

FIG. 22 shows an ELEVENTH EXAMPLE of the present invention. In the ELEVENTH EXAMPLE, as in the FIRST EXAMPLE, a cover glass serving as a filter 6 is disposed between the second face of the second lens 4 and the image-taking surface 7.

The imaging lens 1 of the ELEVENTH EXAMPLE was set under the following conditions:

| Lens Data |
|---|
| L = 2.11 mm, fl = 1.97 mm, $f_1$ = 2.2 mm, $f_2$ = 8.46 mm, $d_1$ = 0.37 mm, $d_2$ = 0.35 mm, $d_3$ = 0.38 mm, F no = 3.25 |

| Face Number (Object Point) (Diaphragm) | r | d | nd | vd |
|---|---|---|---|---|
| 1 (First Face of First Lens) | 0.58 | 0.37 | 1.531 | 56.0 |
| 2 (Second Face of First Lens) | 0.88 | 0.35 | | |
| 3 (First Face of Second Lens) | −10.00 | 0.38 | 1.531 | 56.0 |
| 4 (Second Face of Second Lens) | −3.15 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.05 mm closer to the image surface side than the point on the optical axis 8 of the first face of the first lens 3.

| Face Number | k | A | B | C |
|---|---|---|---|---|
| 1 | 5.21E−1 | −2.80E−1 | −2.61 | 4.68E+1 |
| 2 | 3.18 | 4.06E−1 | −5.76 | 8.66E+1 |
| 3 | 0.00 | −1.77 | 8.60 | −5.46E+1 |
| 4 | −7.44E+1 | −1.05 | 2.33 | −5.94 |

Under such conditions, $(r_3+r_4)/(r_3-r_4)=1.92$ was achieved, thereby satisfying the expression (1). $d_2/d_1=0.95$ was achieved, thereby satisfying the expression (2). $f_1/f_2=0.26$ was achieved, thereby satisfying the expression (3). $f_1/fl=1.12$ was achieved, thereby satisfying the expression (4). $f_2/fl=4.29$ was achieved, thereby satisfying the expression (5). $L/fl=1.07$ was achieved, thereby satisfying the expression (6). $d_1/fl=0.19$ was achieved, thereby satisfying the expression (7). $d_3/fl=0.19$ was achieved, thereby satisfying the expression (8). S=0.05 mm was achieved, thereby satisfying the expression (9). $Bfl/fl=0.51$ was achieved, thereby satisfying the expression (10). Bfl=1.01 mm was achieved, thereby satisfying the expression (11).

Figure 23:
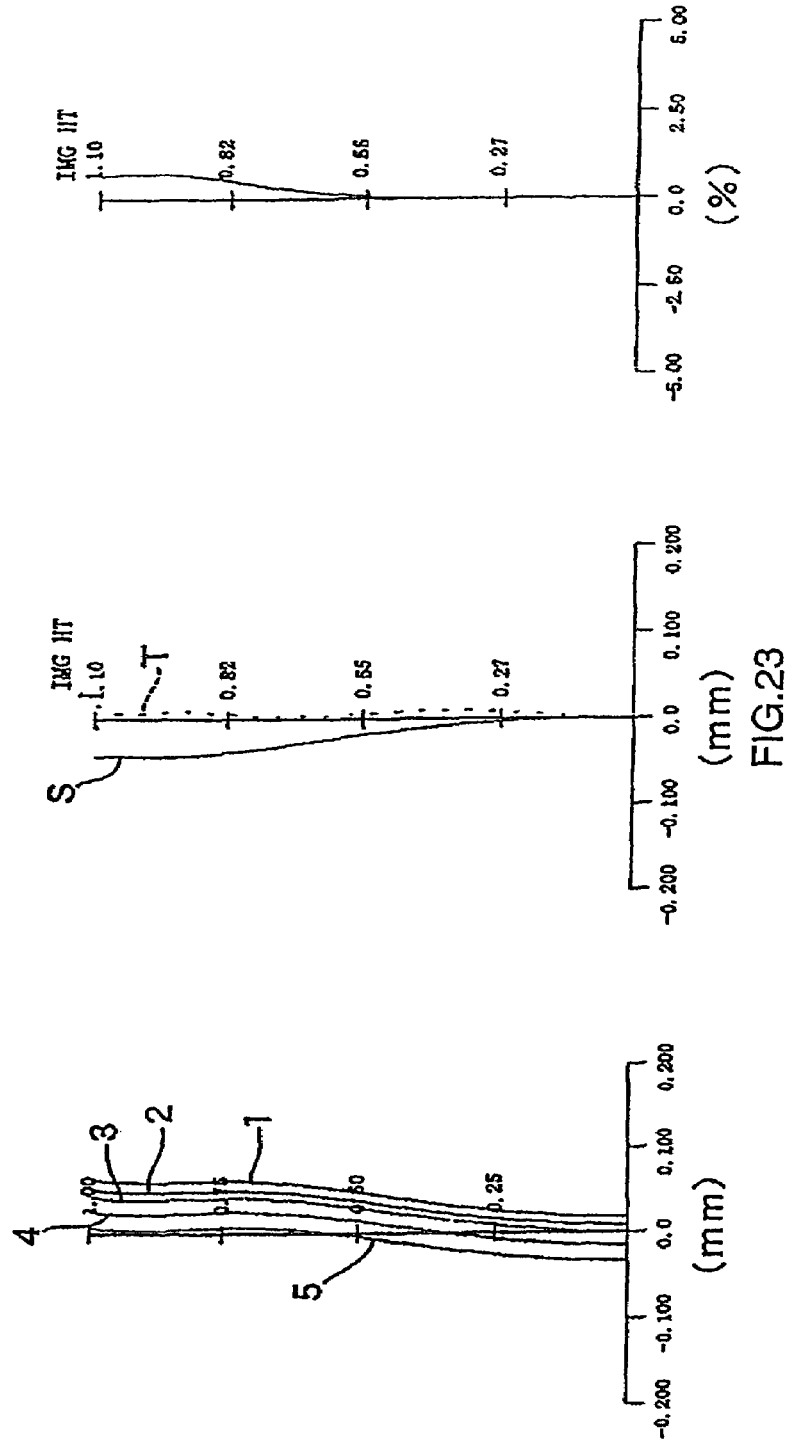
FIG. 23 shows graphs for describing the spherical aberration, astigmatism, and distortion of the imaging lens shown in FIG. 22.

FIG. 23 shows the spherical aberration, the astigmatism, and the distortion in the imaging lens 1 of the ELEVENTH EXAMPLE.

According to the result, each of the spherical aberration, the astigmatism, and the distortion was almost satisfied. It can be seen from the result that a sufficient optical property can be obtained.

Twelfth Example

Figure 24:
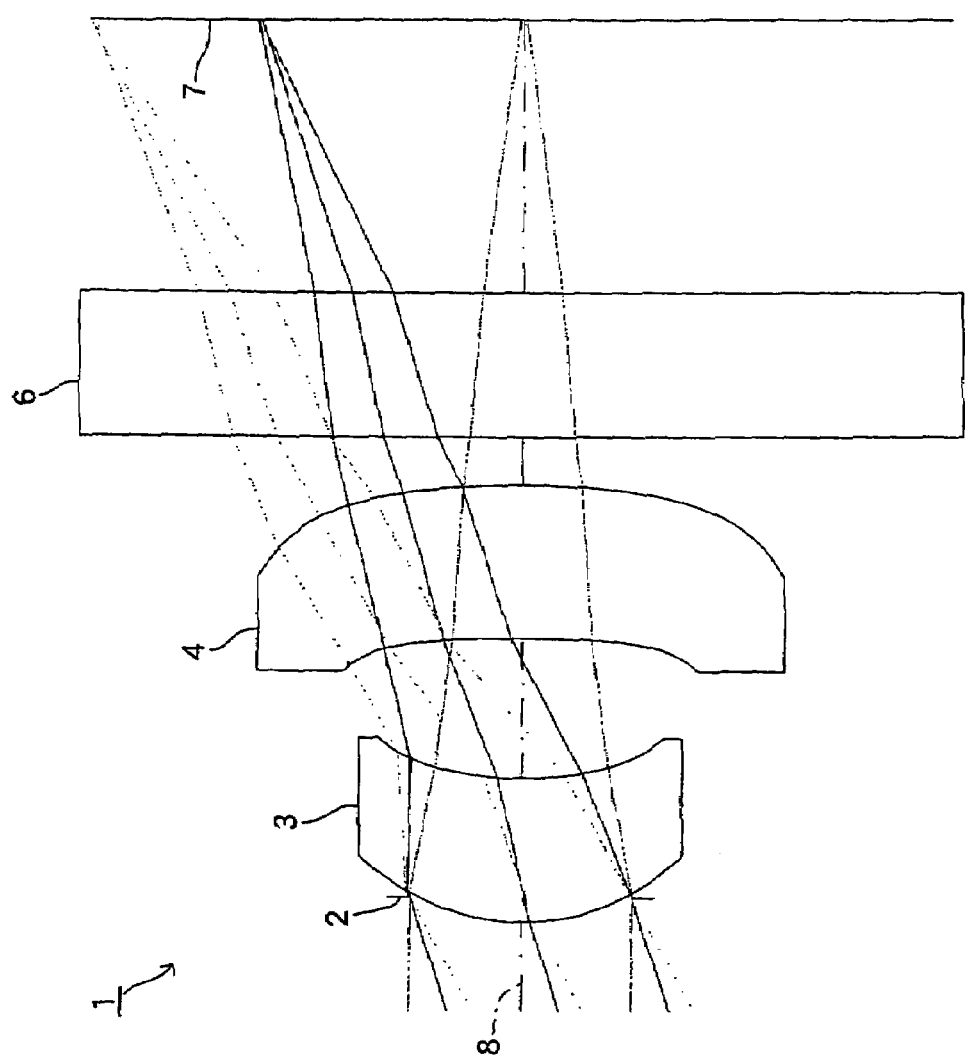
FIG. 24 is a schematic diagram for showing a TWELFTH EXAMPLE of the imaging lens according to the present invention.

FIG. 24 shows a TWELFTH EXAMPLE of the present invention. In the TWELFTH EXAMPLE, as in the FIRST EXAMPLE, a cover glass serving as a filter 6 is disposed between the second face of the second lens 4 and the image-taking surface 7.

The imaging lens 1 of the TWELFTH EXAMPLE was set under the following conditions:

Lens Data
L = 1.76 mm, fl = 1.64 mm, $f_1$ = 1.85 mm, $f_2$ = 6.7 mm,
$d_1$ = 0.3 mm, $d_2$ = 0.29 mm, $d_3$ = 0.32 mm, F no = 3.25

| Face Number (Object Point) (Diaphragm) | r | d | nd | vd |
|---|---|---|---|---|
| 1 (First Face of First Lens) | 0.48 | 0.30 | 1.531 | 56.0 |
| 2 (Second Face of First Lens) | 0.73 | 0.29 | | |
| 3 (First Face of Second Lens) | −9.62 | 0.32 | 1.531 | 56.0 |
| 4 (Second Face of Second Lens) | −2.64 | 0.10 | | |
| 5 (First Face of Cover Glass) | 0.00 | 0.30 | 1.516 | 64.0 |
| 6 (Second Face of Cover Glass) (Image Surface) | 0.00 | | | |

The diaphragm 2 is disposed in a position 0.05 mm closer to the image surface side than the point on the optical axis 8 of the first face of the first lens 3.

| Face Number | k | A | B | C |
|---|---|---|---|---|
| 1 | 5.21E−1 | −4.78E−1 | −6.36 | 1.63E+2 |
| 2 | 3.18 | 6.93E−1 | −1.40E+1 | 3.01E+2 |
| 3 | 0.00 | −3.03 | 2.09E+1 | −1.90E+2 |
| 4 | −7.44E+1 | −1.79 | 5.70 | −2.06E+1 |

Under such conditions, $(r_3+r_4)/(r_3-r_4)$=1.76 was achieved, thereby satisfying the expression (1). $d_2/d_1$=0.97 was achieved, thereby satisfying the expression (2). $f_1/f_2$=0.28 was achieved, thereby satisfying the expression (3). $f_1$/fl=1.13 was achieved, thereby satisfying the expression (4). $f_2$/fl=4.09 was achieved, thereby satisfying the expression (5). L/fl=1.07 was achieved, thereby satisfying the expression (6). $d_1$/fl=0.18 was achieved, thereby satisfying the expression (7). $d_3$/fl=0.20 was achieved, thereby satisfying the expression (8). S=0.05 mm was achieved, thereby satisfying the expression (9). Bfl/fl=0.52 was achieved, thereby satisfying the expression (10). Bfl=0.85 mm was achieved, thereby satisfying the expression (11).

Figure 25:
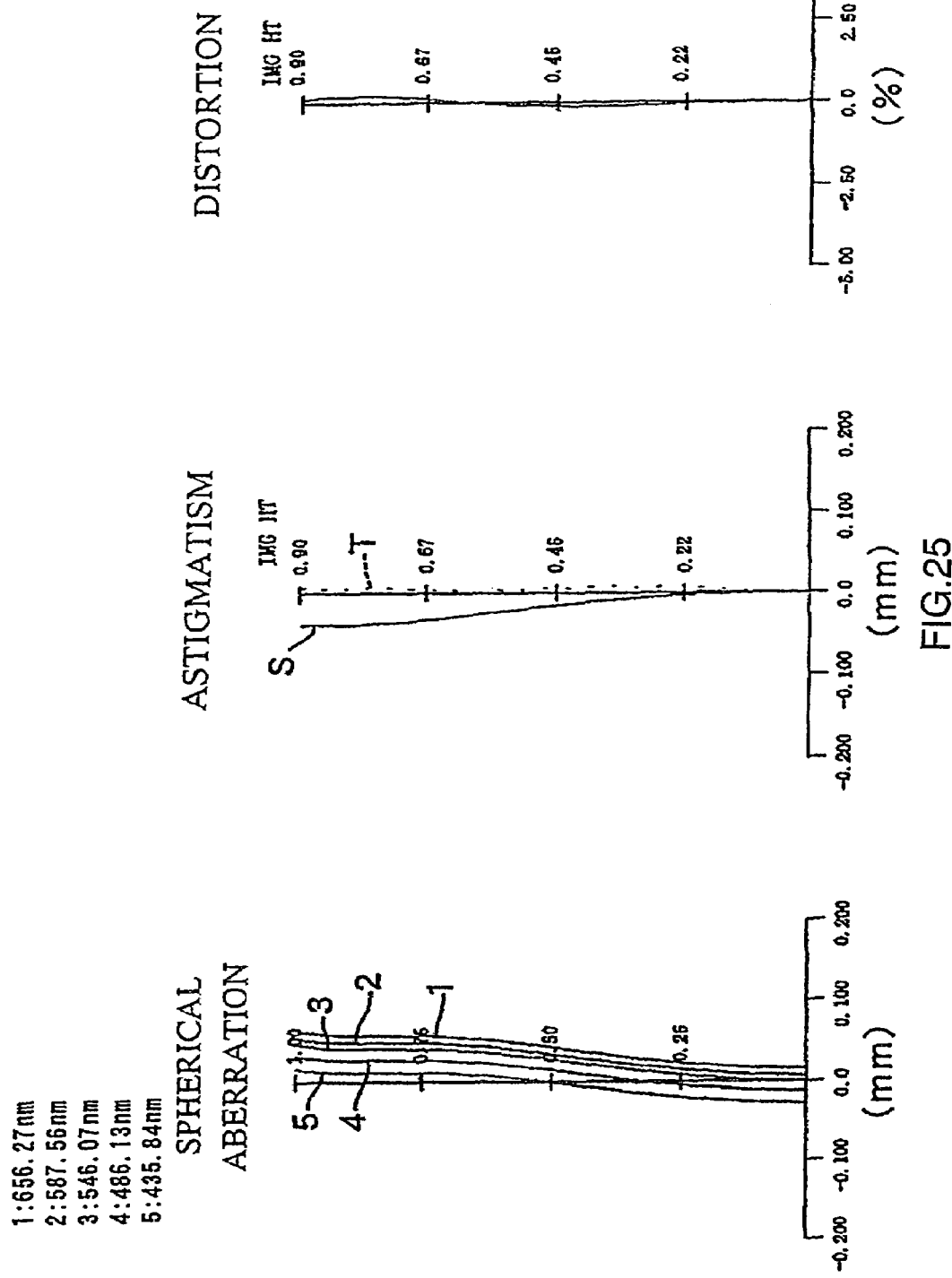
FIG. 25 shows graphs for describing the spherical aberration, astigmatism, and distortion of the imaging lens shown in FIG. 24.

FIG. 25 shows the spherical aberration, the astigmatism, and the distortion in the imaging lens 1 of the TWELFTH EXAMPLE.

According to the result, each of the spherical aberration, the astigmatism, and the distortion was almost satisfied. It can be seen from the result that a sufficient optical property can be obtained.

The present invention is not limited to the above-described embodiments and EXAMPLES, and various modifications are possible as required.

For example, a light-amount limiting plate can be provided between the second face of the first lens 3 and the first face of the second lens 4.

What is claimed is:

1. An imaging lens used for forming an image of an object on an image-taking surface of a solid image sensor element, comprising:

in order from an object side to an image surface side, a diaphragm, a first lens which is a meniscus lens having a positive power whose convex surface faces the object side, and a second lens which is a meniscus lens having a positive power whose convex surface faces the image surface side, wherein a condition expressed by the following expression is to be satisfied:

$$1.45 \leq (r_3+r_4)/(r_3-r_4) \leq 3.4 \quad (1)$$

where,
$r_3$: center radius curvature of the object side face of the second lens
$r_4$: center radius curvature of the image surface side face of the second lens; and wherein:
conditions expressed by following expressions (7) and (8) are to be further satisfied:

$$0.1 \leq d_1/fl \leq 0.27 \quad (7)$$

$$0.1 \leq d_3/fl \leq 0.27 \quad (8)$$

where,
$d_1$: center thickness of the first lens
$d_3$: center thickness of the second lens
fl: focal distance of the entire lens system.

2. The imaging lens according to claim 1, wherein:
a condition expressed by a following expression (2) is to be further satisfied:

$$0.5 \leq d_2/d_1 \leq 1 \quad (2)$$

where,
$d_1$: center thickness of the first lens
$d_2$: distance between the first lens and the second lens on the optical axis.

3. The imaging lens according to claim 1, wherein:
a condition expressed by a following expression (3) is to be further satisfied:

$$0.1 \leq f_1/f_2 \leq 0.4 \quad (3)$$

where,
$f_1$: focal distance of the first lens
$f_2$: focal distance of the second lens.

4. The imaging lens according to claim 1, wherein:
a condition expressed by a following expression (4) is to be further satisfied:

$$1 \leq f_1/fl \leq 1.8 \quad (4)$$

where,
$f_1$: focal distance of the first lens
fl: focal distance of the entire lens system.

5. The imaging lens according to claim 1, wherein:
a condition expressed by a following expression (5) is to be further satisfied:

$$1 \leq f_2/fl \leq 10 \quad (5)$$

where,
$f_2$: focal distance of the second lens
fl: focal distance of the entire lens system.

6. The imaging lens according to claim 1, wherein:
a condition expressed by a following expression (6) is to be further satisfied:

$$0.8 \leq L/fl \leq 1.25 \quad (6)$$

where,
L: length of the entire lens system
fl: focal distance of the entire lens system.

* * * * *